United States Patent
Sakuragawa et al.

(10) Patent No.: US 9,631,946 B2
(45) Date of Patent: Apr. 25, 2017

(54) INFORMATION RETRIEVAL SYSTEM, VEHICLE DEVICE, MOBILE COMMUNICATION TERMINAL, AND INFORMATION RETRIEVAL PROGRAM PRODUCT

(71) Applicant: DENSO CORPORATION, Kariya, Aichi-pref. (JP)

(72) Inventors: Masao Sakuragawa, Kariya (JP); Hiroki Ukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 222 days.

(21) Appl. No.: 14/397,971

(22) PCT Filed: Apr. 24, 2013

(86) PCT No.: PCT/JP2013/002764
§ 371 (c)(1),
(2) Date: Oct. 30, 2014

(87) PCT Pub. No.: WO2013/168384
PCT Pub. Date: Nov. 14, 2013

(65) Prior Publication Data
US 2015/0095327 A1    Apr. 2, 2015

(30) Foreign Application Priority Data

May 7, 2012 (JP) .................................. 2012-106049
Jan. 28, 2013 (JP) .................................. 2013-013485

(51) Int. Cl.
*G06F 17/30* (2006.01)
*G01C 21/36* (2006.01)

(52) U.S. Cl.
CPC ...... *G01C 21/3679* (2013.01); *G01C 21/3688* (2013.01); *G06F 17/3053* (2013.01); *G06F 17/30241* (2013.01); *G06F 17/30867* (2013.01)

(58) Field of Classification Search
USPC .......... 707/727, 706, 758; 455/420; 709/532
See application file for complete search history.

(56) References Cited

U.S. PATENT DOCUMENTS

2009/0082951 A1 * 3/2009 Graessley .......... G01C 21/3602
701/532
2009/0157801 A1 * 6/2009 Barber ............. G06F 17/30994
709/203

(Continued)

FOREIGN PATENT DOCUMENTS

JP    2002171565 A    6/2002
JP    2008293507 A    12/2008

(Continued)

OTHER PUBLICATIONS

International Search Report and Written Opinion (in Japanese with English Translation) for PCT/JP2013/002764, mailed May 21, 2013; ISA/JP.

*Primary Examiner* — Hung T Vy
(74) *Attorney, Agent, or Firm* — Harness, Dickey & Pierce, P.L.C.

(57) ABSTRACT

An information retrieval system includes a mobile communication terminal independently performing a retrieval service provided by a server that is placed outside a vehicle, and a vehicle device equipped to the vehicle and operating in cooperation with the mobile communication terminal to perform the retrieval service via the mobile communication terminal. The vehicle device includes a first vehicle-side input section that enables an input of an intended keyword by multiple times of user manipulation and a second vehicle- (Continued)

side input section that is preliminarily assigned with a frequently used keyword and enables an input of the frequently used keyword by single time of user manipulation. The mobile communication terminal includes a first terminal-side input section that enables an input of the intended keyword by multiple times of user manipulation and a second terminal-side input section enables an input of a predetermined keyword by at least two times of user manipulation.

14 Claims, 13 Drawing Sheets

(56) References Cited

U.S. PATENT DOCUMENTS

| | | | | |
|---|---|---|---|---|
| 2010/0205190 A1* | 8/2010 | Morris | .................... | G06F 3/041 |
| | | | | 707/758 |
| 2011/0238647 A1* | 9/2011 | Ingram | .................... | G08G 1/20 |
| | | | | 707/706 |
| 2012/0282914 A1* | 11/2012 | Alexander | ........ | H04M 1/72527 |
| | | | | 455/420 |

FOREIGN PATENT DOCUMENTS

| | | |
|---|---|---|
| JP | 2010026104 A | 2/2010 |
| JP | 2010038620 A | 2/2010 |
| JP | 2012047703 A | 3/2012 |
| WO | WO-2010047035 A1 | 4/2010 |

* cited by examiner

INFORMATION RETRIEVAL SYSTEM, VEHICLE DEVICE, MOBILE COMMUNICATION TERMINAL, AND INFORMATION RETRIEVAL PROGRAM PRODUCT

CROSS REFERENCE TO RELATED APPLICATIONS

This application is a U.S. National Phase Application under 35 U.S.C. 371 of International Application No. PCT/JP2013/002764 filed on Apr. 24, 2013 and published in Japanese as WO 2013/168384 A1 on Nov. 14, 2013. This application is based on and claims the benefit of priority from Japanese Patent Applications No. 2012-106049 filed on May 7, 2012, and No. 2013-013485 filed on Jan. 28, 2013, the disclosures of which are incorporated herein by reference.

The present disclosure is based on Japanese Patent Applications No. 2012-106049 filed on May 7, 2012, and No. 2013-013485 filed on Jan. 28, 2013, the disclosures of which are incorporated herein by reference.

TECHNICAL FIELD

The present disclosure relates to an information retrieval system, a vehicle device, a mobile communication terminal, and an information retrieval program product operating in cooperation with a mobile communication terminal.

BACKGROUND ART

Conventionally, there is known a vehicle device operating in cooperation with a mobile communication terminal. For example, patent literature 1 describes a terminal device that displays an image received via a mobile communication terminal.

Recently, there is provided a Point of Interest (POI) retrieval service (hereinafter referred to simply as a retrieval service) that allows a networked server to store various types of information, such as facilities, and retrieve information corresponding to keywords entered by a user.

Generally, many retrieval services require a user to enter a keyword in order to retrieve user-requested information.

From a safety viewpoint, however, it is unfavorable for a user to watch a screen on a mobile communication terminal or a vehicle device operating in cooperation with the mobile communication terminal in order to enter a keyword while the user is driving a vehicle, for example. On the other hand, unexceptionally inhibiting the use of retrieval service during the travel may excessively limit the convenience.

PRIOR ART LITERATURES

Patent Literature

Patent Literature 1: JP-A-2010-26104

SUMMARY OF INVENTION

In view of the foregoing difficulties, it is an object of the present disclosure to provide an information retrieval system, a vehicle device, a mobile communication terminal, and an information retrieval program product, which are capable of ensuring safety even if a retrieval service is used when a vehicle is in a traveling state.

According to a first aspect of the present disclosure, an information retrieval system includes a mobile communication terminal and a vehicle device. The mobile communication terminal independently performs a retrieval service provided by a server that is placed outside a vehicle. The vehicle device is equipped to the vehicle and operates in cooperation with the mobile communication terminal to perform the retrieval service via the mobile communication terminal. The vehicle device includes a vehicle-side display portion, a vehicle-side manipulation portion, and a vehicle-side control portion. The vehicle-side display portion displays information related to the retrieval service. The vehicle-side manipulation portion has a first vehicle-side input section and a second vehicle-side input section. The first vehicle-side input section enables an input of an intended keyword to be searched by multiple times of user manipulation, and the second vehicle-side input section is preliminarily assigned with a frequently used keyword and enables an input of the frequently used keyword directly by single time of user manipulation. The frequently used keyword is a keyword that is frequently used by a user in the vehicle. The vehicle-side control portion executes a retrieval process based on a vehicle-side keyword that corresponds to one of the intended keyword inputted via the vehicle-side manipulation portion or the frequently used keyword inputted via the vehicle-side manipulation portion. The vehicle-side control portion transmits the vehicle-side keyword to the mobile communication terminal during the retrieval process, controls the mobile communication terminal to retrieve information related to the vehicle-side keyword by performing the retrieval service, acquires a retrieval result from the server via the mobile communication terminal, and controls the vehicle-side display portion to display the retrieval result as the information related to the retrieval service. The mobile communication terminal includes a terminal-side display portion, a terminal-side manipulation portion, and a terminal-side control portion. The terminal-side display portion displays information related to the retrieval service. The terminal-side manipulation portion has a first terminal-side input section and a second terminal-side input section. The first terminal-side input section enables an input of the intended keyword to be searched by multiple times of user manipulation, and the second terminal-side input section enables an input of a predetermined keyword by at least two times of user manipulation. The terminal-side control portion transmits, to the server, a terminal-side keyword corresponding to one of the intended keyword inputted via the terminal-side manipulation portion or the predetermined keyword inputted via the terminal-side manipulation portion, acquires a retrieval result transmitted from the server, and controls the terminal-side display portion to display the retrieval result as the information related to the retrieval service.

The above-mentioned information retrieval system can ensure the safety when the retrieval service is used during a traveling state of the vehicle.

According to a second aspect of the present disclosure, a vehicle device is applied in the information retrieval system according to the first aspect of the present disclosure. The vehicle device is equipped to a vehicle and connected with a mobile communication terminal that independently performs a retrieval service. The vehicle device includes a vehicle-side display portion, a vehicle-side manipulation portion, and a vehicle-side control portion. The vehicle-side display portion displays information related to the retrieval service. The vehicle-side manipulation portion has a first vehicle-side input section and a second vehicle-side input section. The first vehicle-side input section enables an input of an intended keyword to be searched by multiple times of user manipulation, and the second vehicle-side input section is preliminarily assigned with a frequently used keyword and enables an input of the frequently used keyword directly by single time of user manipulation. The frequently used keyword is a keyword that is frequently used by a user in the vehicle. The vehicle-side control portion executes a retrieval process based on a vehicle-side keyword that corresponds to one of the intended keyword inputted via the vehicle-side manipulation portion or the frequently used keyword inputted via the vehicle-side manipulation portion. The vehicle-side control portion transmits the vehicle-side keyword to the mobile communication terminal during the retrieval process, controls the mobile communication terminal to retrieve information related to the vehicle-side keyword by performing the retrieval service, acquires a retrieval result from the server via the mobile communication terminal, and controls the vehicle-side display portion to display the retrieval result as the information related to the retrieval service. When the vehicle-side keyword is equal to the terminal-side keyword, a quantity of the user manipulation required for inputting the vehicle-side keyword via the second vehicle-side input section of the vehicle device is less than a quantity of the user manipulation required for inputting the terminal-side keyword via the mobile communication terminal.

The above-mentioned vehicle device can ensure the safety when the retrieval service is used during the traveling state of the vehicle.

According to a third aspect of the present disclosure, a mobile communication terminal is applied in the information retrieval system according to the first aspect. The mobile communication terminal independently performs a retrieval service, and includes a terminal-side display portion, a terminal-side manipulation portion, and a terminal-side control portion. The terminal-side display portion displays information related to the retrieval service. The terminal-side manipulation portion has a first terminal-side input section and a second terminal-side input section. The first terminal-side input section enables an input of the intended keyword to be searched by multiple times of user manipulation, and the second terminal-side input section enables an input of a predetermined keyword by at least two times of user manipulation. The terminal-side control portion transmits, to the server, a terminal-side keyword corresponding to one of the intended keyword inputted via the terminal-side manipulation portion or the predetermined keyword inputted via the terminal-side manipulation portion, acquires a retrieval result transmitted from the server, and controls the terminal-side display portion to display the retrieval result as the information related to the retrieval service. When the intended keyword is equal to the predetermined keyword, a quantity of the user manipulation required for inputting the predetermined keyword via the second terminal-side input section is less than a quantity of the user manipulation required for inputting the intended keyword via the first terminal-side input section.

The above-mentioned mobile communication terminal can ensure the safety when the retrieval service is used during the traveling state of the vehicle. The mobile communication terminal can independently use various services, including the retrieval service. For example, a user can retrieve a destination before boarding and, soon after boarding, set the retrieved destination as an intended destination with a single touch of a button.

According to a fourth aspect of the present disclosure, an information retrieval program product stored in a non-transitory tangible computer-readable storage medium included in a vehicle device includes instructions to be executed by a computer. The vehicle device is connected to a mobile communication terminal that independently performs a retrieval service provided by a server placed outside a vehicle. The vehicle device performs the retrieval service via the mobile communication terminal. The instructions included in the information retrieval program product are for implementing displaying information related to the retrieval service on a vehicle-side display portion of the vehicle device, specifying a vehicle-side keyword that corresponds to one of an intended keyword or a frequently used keyword when a manipulation is made by a user on one of a first vehicle-side input section of the vehicle device or a second vehicle-side input section of the vehicle device, transmitting the vehicle-side keyword to the mobile communication terminal, controlling the mobile communication terminal to retrieve information related to the vehicle-side keyword by performing the retrieval service, controlling the mobile communication terminal to acquire a retrieval result from the server, and controlling the vehicle-side display portion to display the retrieval result as the information related to the retrieval service. The first vehicle-side input section enables an input of the intended keyword according to an intention of the user, and the second vehicle-side input section is preliminarily assigned with the frequently used keyword and enables an input of the frequently used keyword directly by single time of the manipulation. The frequently used keyword is a keyword that is frequently used by the user in the vehicle.

The above-described information retrieval program product can ensure the safety when the retrieval service is used during the traveling state of the vehicle.

BRIEF DESCRIPTION OF DRAWINGS

The above and other objects, features and advantages of the present disclosure will become more apparent from the following detailed description made with reference to the accompanying drawings. In the drawings:

FIG. 16(a) and FIG. 16(b) are diagrams illustrating example keyword list windows displayed on the vehicle device;

EMBODIMENTS FOR CARRYING OUT INVENTION

Embodiments of the present disclosure will be described with reference to the accompanying drawings.

First Embodiment

The first embodiment of the present disclosure will be described with reference to FIGS. 1 through 17.

Figure 1:
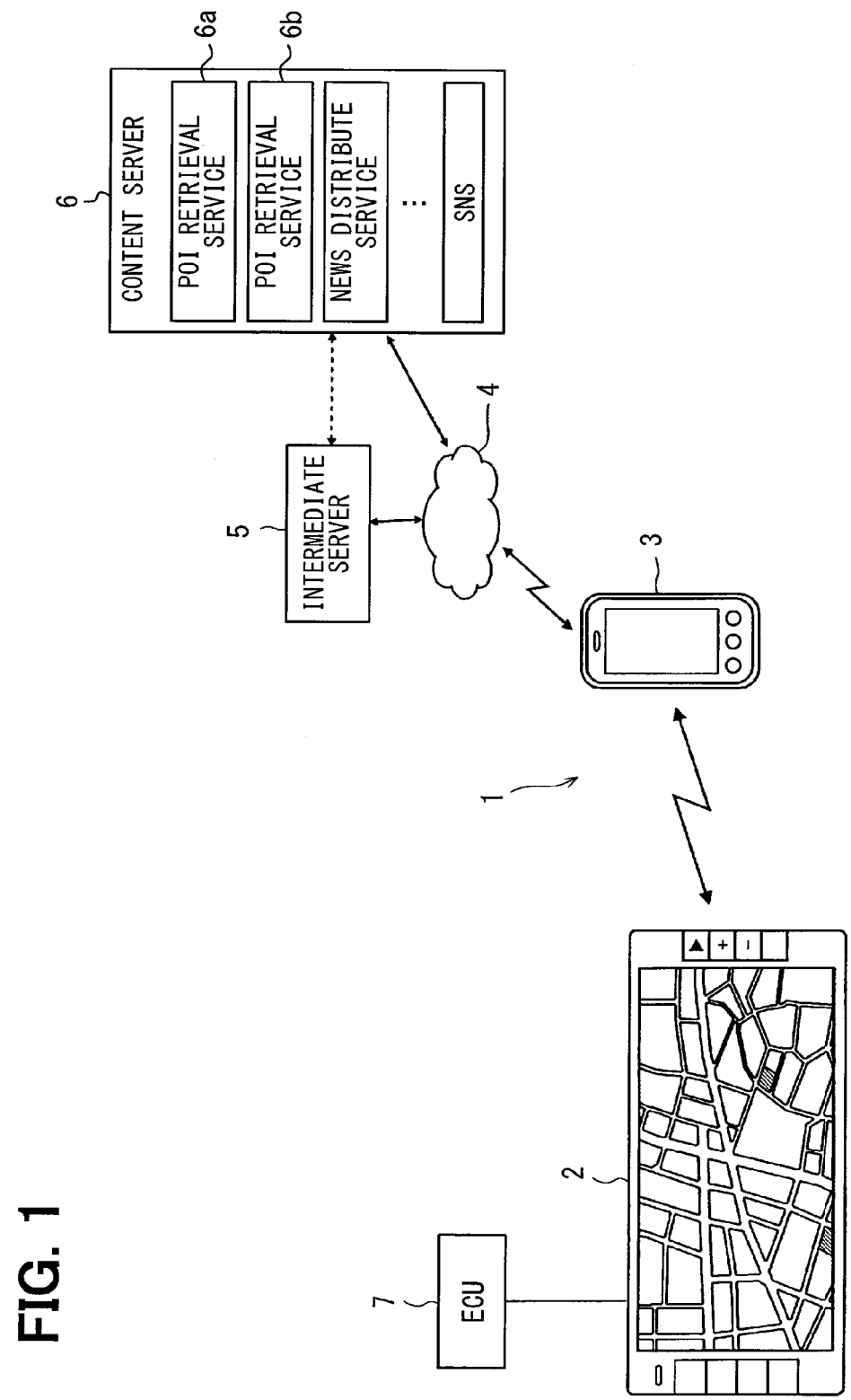
FIG. 1 is a schematic diagram illustrating a configuration of an information retrieval system according to an embodiment of the present disclosure.

As illustrated in FIG. 1, an information retrieval system 1 includes a vehicle device 2 and a mobile communication terminal 3. In the information retrieval system 1, the vehicle device 2 is communicably connected to an intermediate server 5 via an external network 4, which is connected with the mobile communication terminal 3. The vehicle device 2 is also communicably connected with a content server 6. The vehicle device 2 is mounted on a vehicle (not illustrated). In this case, the vehicle device 2 is not limited to a device that is fixed in a vehicle compartment, but may also be provided by a device that is movable in the vehicle compartment. The information retrieval system 1 is also connected with an electronic control unit (ECU) 7 that controls the vehicle. Although FIG. 1 illustrates one ECU 7, the vehicle may be mounted with a plurality of ECUs connected to an onboard local area network (LAN), such as a Controller Area Network (CAN) or the like.

The following will describe use of contents in the information retrieval system 1. The information retrieval system 1 allows the use of various types of contents provided by the content server 6. The content includes an application program and data, which are prepared for providing a specified service. The specified services, which are provided by executing the application program of the content, may include, for example, a retrieval service, a news distribution service, SNS (Social Networking Service), and a music streaming service. The contents that provide above-described services may be provided by only one content provider or may be provided by multiple content providers. For example, the POI retrieval service uses a content server 6a provided by a content provider A and a content server 6b provided by a content provider B. The content server 6a is also referred to as a first sub-server. The content server 6b is also referred to as a second sub-server. The names of first and second sub-servers are used for differentiating servers that provide different services, but not for limiting the number of servers.

In many cases, the contents are provided in data formats specific to respective content providers. For this reason, the information retrieval system 1 provides an intermediate server 5 between a mobile terminal and the content server 6. The intermediate server 5 converts various data formats of the contents provided from multiple content providers into a unified data format.

Among above-described various services, a retrieval service will be described in detail in the present embodiment. The retrieval service is capable of searching for various types of information such as information related to user-specified keywords and information included in predetermined categories.

Figure 2:
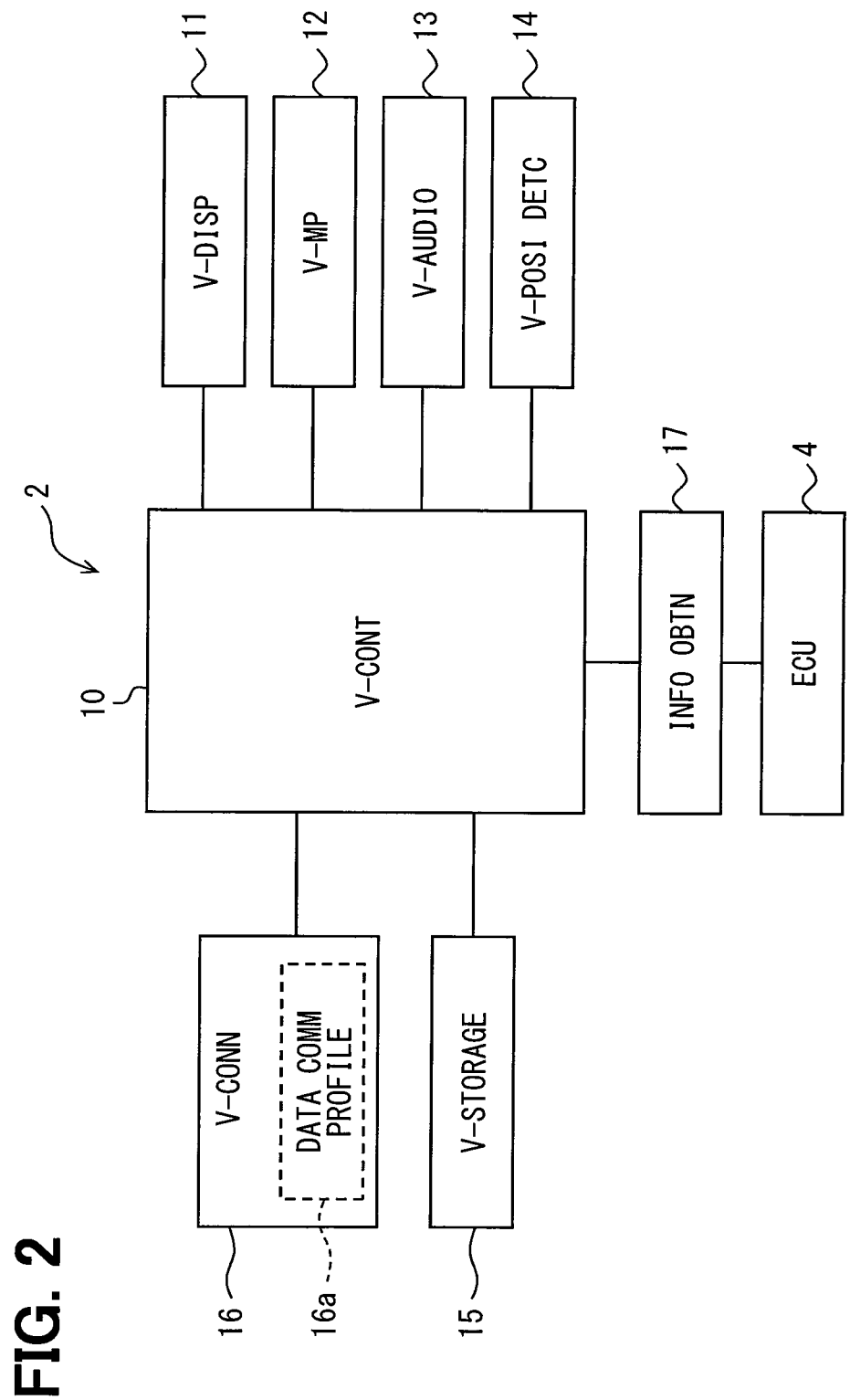
FIG. 2 is a schematic diagram illustrating a configuration of a vehicle device.

As illustrated in FIG. 2, the vehicle device 2 includes a vehicle-side control portion (V-CONT) 10, a vehicle-side display portion (V-DISP) 11, a vehicle-side manipulation portion (V-MP) 12, a vehicle-side audio input output portion (V-AUDIO) 13, a vehicle-side position detection portion (V-POSI DETC) 14, a vehicle-side storage portion (V-STORAGE) 15, a vehicle-side connection portion (V-CONN) 16, and a vehicle information acquisition portion (INFO OBTN) 17. The vehicle-side control portion 10 is configured as a microcomputer having a CPU, ROM, and RAM though not illustrated. The vehicle-side control portion 10 controls the whole of the vehicular device 2 according to a program stored in the ROM. The vehicle-side control portion 10 is capable of executing an application that cooperates with the mobile communication terminal 3. Specifically, according to the present embodiment, the vehicle-side control portion 10 can perform a process that allows the mobile communication terminal 3 to perform retrieval operation using the retrieval service. As will be described later, when the process time required for completing a process using the retrieval service is estimated to exceed a predetermined reference time, the vehicle-side control portion 10 disables the use of all or part of retrieval service functions. The vehicle-side control portion 10 also functions as a change portion, which will be described later.

The vehicle-side display portion 11 is provided by, for example, a liquid crystal display instrument, an organic EL display instrument, or a plasma display instrument, which is capable of performing a color display. The vehicle-side display portion 11 displays a manipulation window of the vehicle device 2 or a map window when the navigation function is used, for example. As will be described later, the vehicle-side display portion 11 also displays information related to the retrieval service, such as various manipulation windows and retrieval results during a retrieval process, for example.

The vehicle-side manipulation portion 12 includes a touch panel corresponding to the vehicle-side display portion 11 and a contact-type switch provided around the vehicle-side display portion 11. A user uses the vehicle-side manipulation portion 12 to input manipulation on the vehicle device 2. The touch panel is available as any of pressure-sensitive, electromagnetic, and electrostatic inductive types, for example. More specifically, the vehicle-side manipulation portion 12 may have the vehicle-side display portion 11. The vehicle-side display portion 11 displays a retrieval service window that includes a keyword display section 30 and a category display section 31. The keyword display section 30 includes a keyword input button M3 (corresponding to a first vehicle-side input section). The category display section 31 includes shortcut keys M5 through M7 (corresponding to a second vehicle-side input section). The shortcut keys M5 through M7 of the category display section 31 correspond to a sub-input section of the second vehicle-side input section.

The keyword display section 30 and the category display section 31 included in the retrieval service window will be described later in detail.

The vehicle-side audio input output portion 13 has a speaker and a microphone (not illustrated). The vehicle-side audio input output portion 13 outputs a music stored in the vehicle-side storage portion 15 or an audio guidance from the vehicle device 2, for example. Further, the vehicle-side audio input output portion 13 also receives user's voice manipulation made on the vehicle device 2. The vehicle-side position detection portion 14 has a GPS unit or a gyro sensor to detect a position of the vehicle device 2 or, more specifically, a position of the vehicle provided with the vehicle device 2. The technique of detecting the position using the GPS unit is well known and a detailed description is omitted for simplicity.

The vehicle-side control portion 10 performs a navigation process that guides the vehicle to a destination based on the vehicle position detected by the vehicle-side position detection portion 14. In the present embodiment, navigation system is used as the vehicle device 2. The vehicle-side storage portion 15 stores music data, map data used for the navigation function, and various application programs executed by the vehicle device 2. The application program is hereinafter abbreviated as an application (APP).

The vehicle-side connection portion 16 performs a communication with the mobile communication terminal 3. In the present embodiment, communication system based on Bluetooth (registered trademark) is used as a wireless communication system. In the description below, Bluetooth (registered trademark) is also referred to as BT and a connection based on BT is also referred to as BT connection. The vehicle-side connection portion 16 includes a data communication profile (DATA COMM PROFILE) 16a. Using the profile, the vehicle-side connection portion 16 connects with the mobile communication terminal 3. In the case of BT, the data communication profile corresponds to Serial Port Profile (SPP) or Dial-up Networking Profile (DUN), for example.

A vehicle information acquisition portion 17 is connected to the ECU 7 and acquires various types of information related to the vehicle. The vehicle information acquisition portion 17 acquires information related to the vehicle, such as a speed of the vehicle (hereinafter referred to as vehicle speed) and air conditioner temperature settings, for example. Among various vehicle related information acquired by the vehicle information acquisition portion 17, an formation that indicates whether the vehicle is traveling or not corresponds to a vehicle information. That is, it is possible to determine whether the vehicle is traveling based on the vehicle information acquired by the vehicle information acquisition portion 17. In the present embodiment, information that indicates the vehicle speed or a vehicle traveling state (e.g., data 1 that indicates a traveling state of a vehicle or data 0 that indicates a stationary state of the vehicle) is used as the vehicle information.

The mobile communication terminal 3 can independently use the retrieval service. Even if not connected to the vehicle device 2, the mobile communication terminal 3 can use the retrieval service. However, in the present embodiment, manipulations made on the mobile communication terminal 3 including the use of the retrieval service are basically forbidden when the mobile communication terminal 3 is connected to the vehicle device 2.

Figure 3:
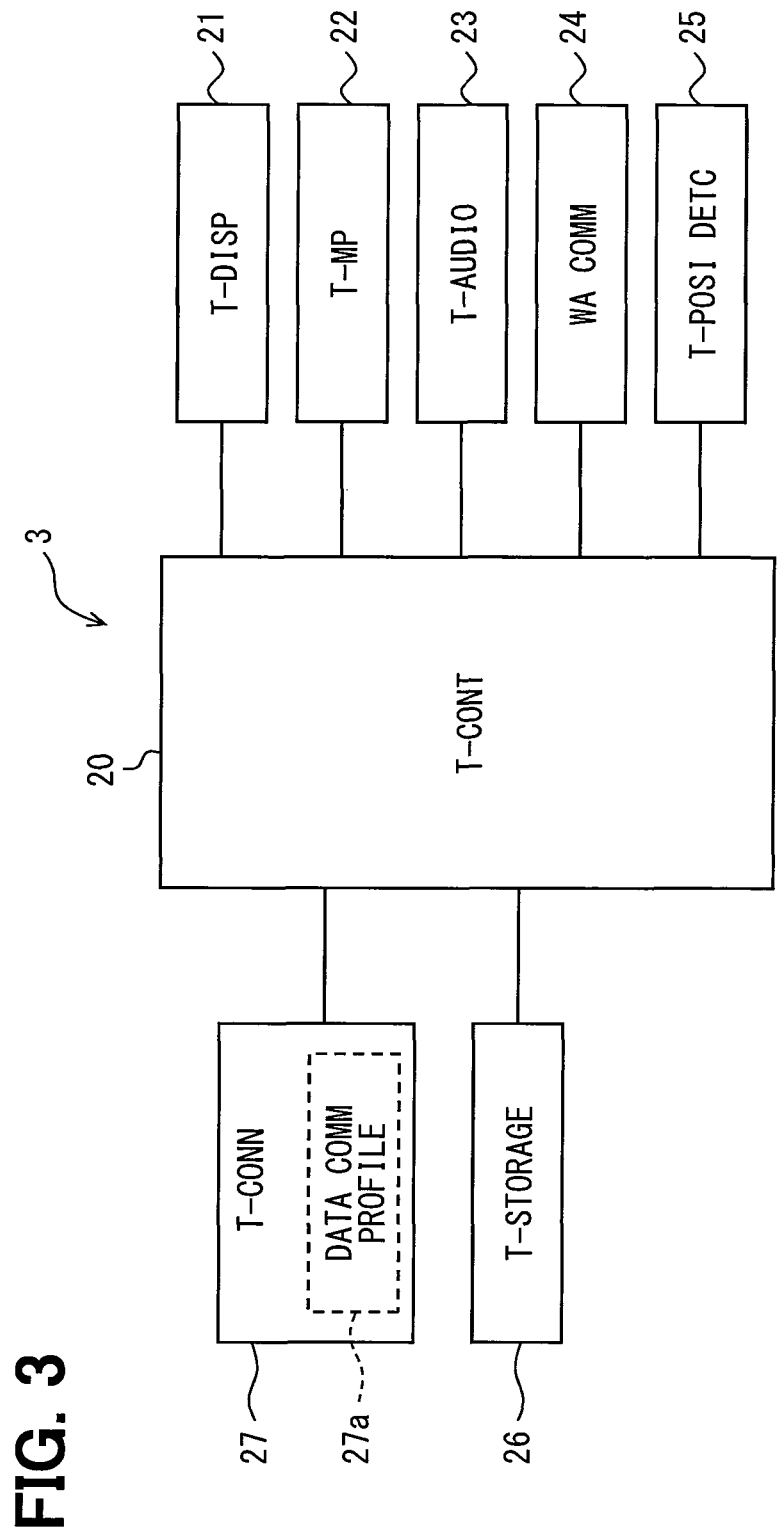
FIG. 3 is a schematic diagram illustrating configuration of a mobile communication terminal.

As illustrated in FIG. 3, the mobile terminal 3 includes a terminal-side control portion (T-CONT) 20, a terminal-side display portion (T-DISP) 21, a terminal-side manipulation portion (T-MP) 22, a terminal-side audio input output portion (T-AUDIO) 23, a communication portion (WA COMM) 24, a terminal-side position detection portion (T-POSI DETC) 25, a terminal-side storage portion (T-STORAGE) 26, and a terminal-side connection portion (T-CONN) 27. In the present embodiment, assume that the mobile communication terminal 3 is provided by a smartphone. The terminal-side control portion 20 is configured as a microcomputer having a CPU, ROM, and RAM though not illustrated. The terminal-side control portion 20 controls the whole of the mobile communication terminal 3 according to a program stored in the ROM. The terminal-side control portion 20 is capable of executing an application that cooperates with the vehicle device 2.

The terminal-side display portion 21 is provided by, for example, a liquid crystal display or an organic EL display, which is capable of performing a color display. The terminal-side display portion 21 displays telephone directory data and images or videos stored in the terminal-side storage portion 26, for example. The terminal-side display portion 21 also displays a category button M2 (corresponding to a second terminal-side input section) (see FIG. 6), which will be described later. The terminal-side manipulation portion 22 includes a touch panel corresponding to the terminal-side display portion 21 and tactile switches provided around the terminal-side display portion 21. The mobile communication terminal 3 receives manipulation made by the user on the terminal-side manipulation portion 22. The touch panel is available as any of pressure-sensitive, electromagnetic inductive, and electrostatic inductive types, for example.

The terminal-side audio input output portion 23 includes a microphone (not illustrated) that inputs a speech made by the user to the mobile communication terminal 3 and a speaker (not illustrated) that outputs a received voice to the user during telephone conversation. The terminal-side audio input output portion 23 also outputs music or video sound stored in the terminal-side storage portion 25, for example. The communication portion 24 performs a wide area communication by connecting to a public line network or a network 4. The communication portion 24 enables telephone conversation and transmits data to or receives data from the network 4. The terminal-side position detection portion 25 has a GPS unit or a gyro sensor to detect a position of the mobile communication terminal 3. The technique of detecting the position using the GPS unit is well known and a detailed description is omitted for simplicity. The terminal-side storage portion 26 stores various applications executed on the terminal side and data saved by the user as well as telephone directory data and music.

The terminal-side connection portion 27 enables communication with the vehicle device 2. As described above, in the present embodiment, uses the BT-based wireless communication system. Thus, the mobile terminal 3 is BT-connected to the vehicle device 2. Similar to the vehicle device 2, the terminal-side connection portion 27 includes a data communication profile (DATA COMM PROFILE) 27a (corresponding to SPP or DUN in the present embodiment) and connects with the vehicle device 2 using the profile. The terminal-side connection portion 27 may use a handsfree telephone conversation profile as well as the data communication profile. In the case of BT, the handsfree profile corresponds to Hands-Free Profile (HFP).

The following will describe operations of the above-mentioned configuration. The mobile terminal 3 is described as MT in the flowcharts described below. As described above, the mobile communication terminal 3 is provided by a smartphone.

Figure 4:
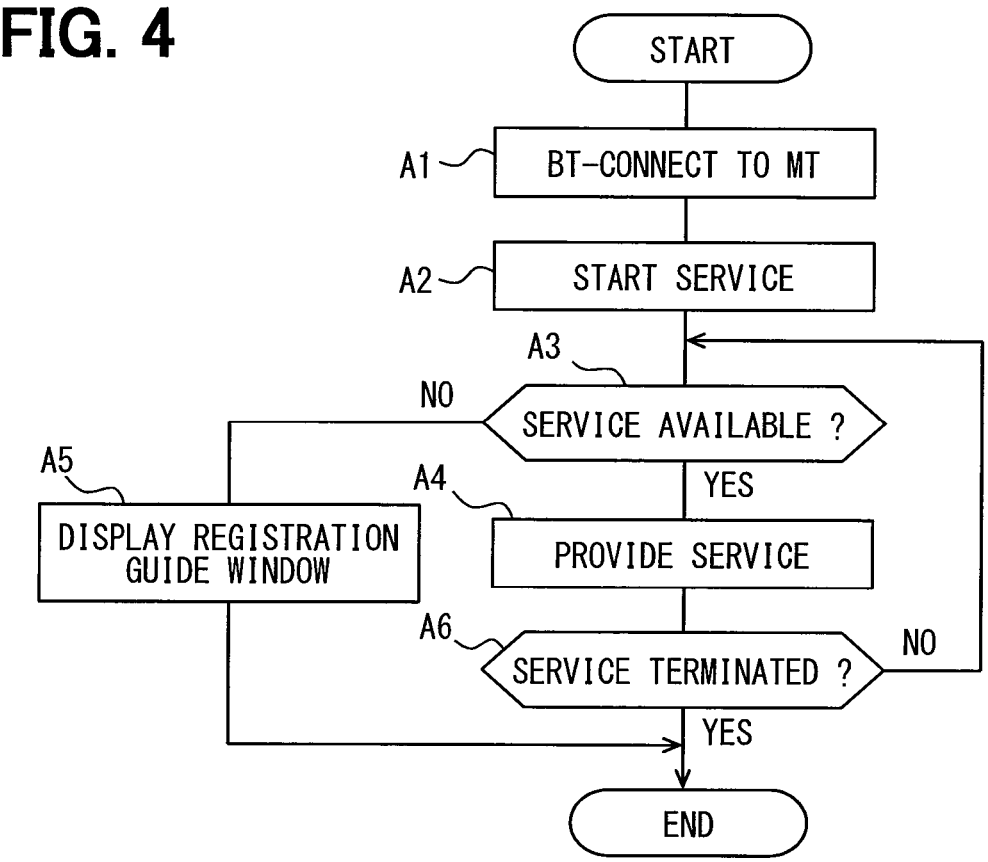
FIG. 4 is flowchart illustrating a control process performed by the vehicle device.
Figure 5:
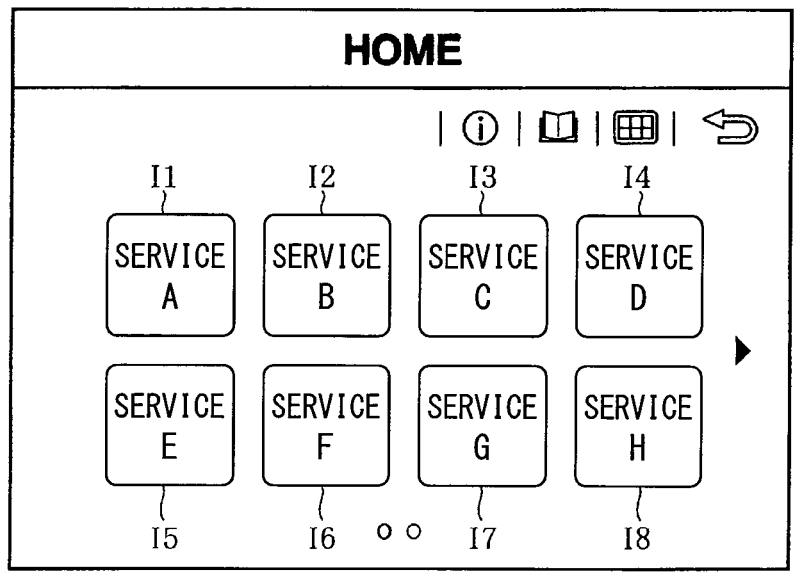
FIG. 5 is a schematic diagram illustrating a home screen of the vehicle device.

The following describes a process performed by the vehicle device 2 with reference to FIGS. 4 and 5. More specifically, the following describes a process performed by the vehicle-side control portion 10 of the vehicle device 2 with reference to FIGS. 4 and 5. As illustrated in FIG. 4, the vehicle device 2 BT-connects with the mobile communication terminal 3 (SP) after startup (turning on a vehicle ACC) (A1). The BT connection signifies a connection made based on BT. In this case, each of the vehicle device 2 and the mobile communication terminal 3 executes an application for cooperation with each other. The vehicle device 2 starts a service when connected to the mobile communication terminal 3 (A2). Starting a service at A2 signifies starting operation in cooperation with the mobile communication terminal 3 in order to use a service (content) provided from the content server 6 via the mobile communication terminal 3.

As illustrated in FIG. 5, the vehicle device 2 allows the vehicle-side display portion 11 to display a home screen including icons I1 through I8 corresponding to available services A through H. A user touches any of the icons I1 through I8 to select an intended service (see FIG. 1). FIG. 5 includes the icons I1, I2, and I3, for example. The icon I1 corresponds to a retrieval service (content A). The icon I2 corresponds to a check-in service (content B) for using a check-in function. The icon I3 corresponds to a photo provision service (content C) for using a location retrieval service based on photos.

Figure 17:
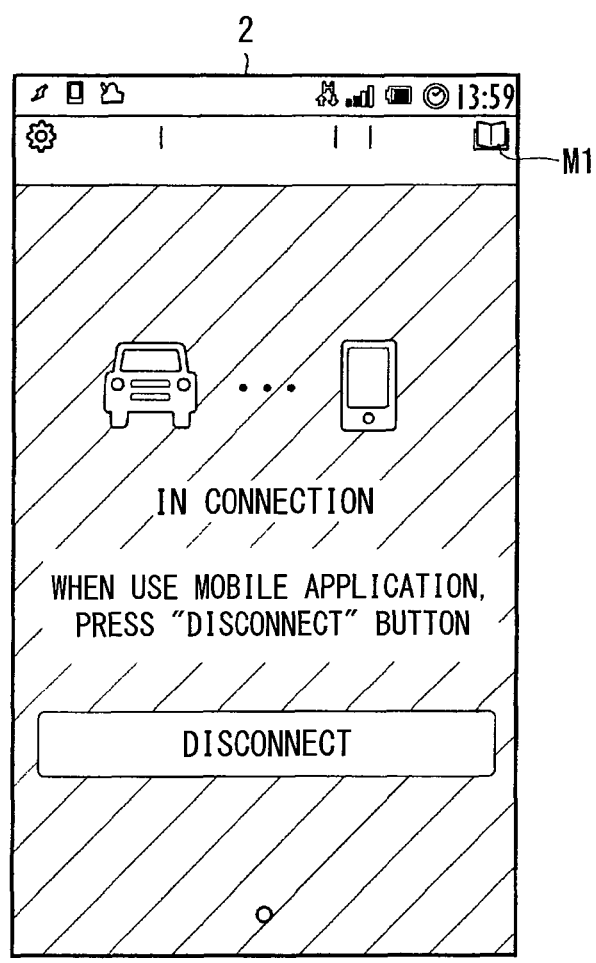
FIG. 17 is a diagram illustrating an example display window on the mobile communication terminal when connected to the vehicle device.

When connected to the vehicle device 2, the mobile communication terminal 3 grays the display except a disconnection button used for disconnection from the vehicle device 2 as illustrated in FIG. 17. FIG. 17 schematically shows the grayed display by the hatching lines. That is, manipulation of the mobile communication terminal 3 is inhibited when it is brought into the vehicle and is connected to the vehicle device 2. In this case, the user can use various services only from the vehicle device 2.

As illustrated in FIG. 4, the vehicle device 2 determines whether it is able to provide the selected service (A3). More specifically, the vehicle device 2 determines at A3 whether a setting to use a service provided from the content server 6 is activated. When the user has several SNS accounts, for example, the user needs to determine one SNS to be used and needs to register the account information to use a specific service. When no service is available, namely, the initialization for using the service has not been performed (A3: NO), the vehicle device 2 displays an account registration guidance window (A5).

As illustrated in FIG. 4, when the initialization has already been performed and the selected service is available (A3: YES), the vehicle device 2 provides the service according to the user manipulation (A4). The vehicle device 2 continues to provide the service until the user makes an instruction to terminate the service being provided (A6: NO). The vehicle device 2 terminates the process if the user makes an instruction to terminate the service (A6: YES).

With above-described configuration, the vehicle device 2 provides a service selected by the user.

The following will describe a retrieval service provision according to the present disclosure in detail with reference to FIGS. 6 through 17.

Figure 6:
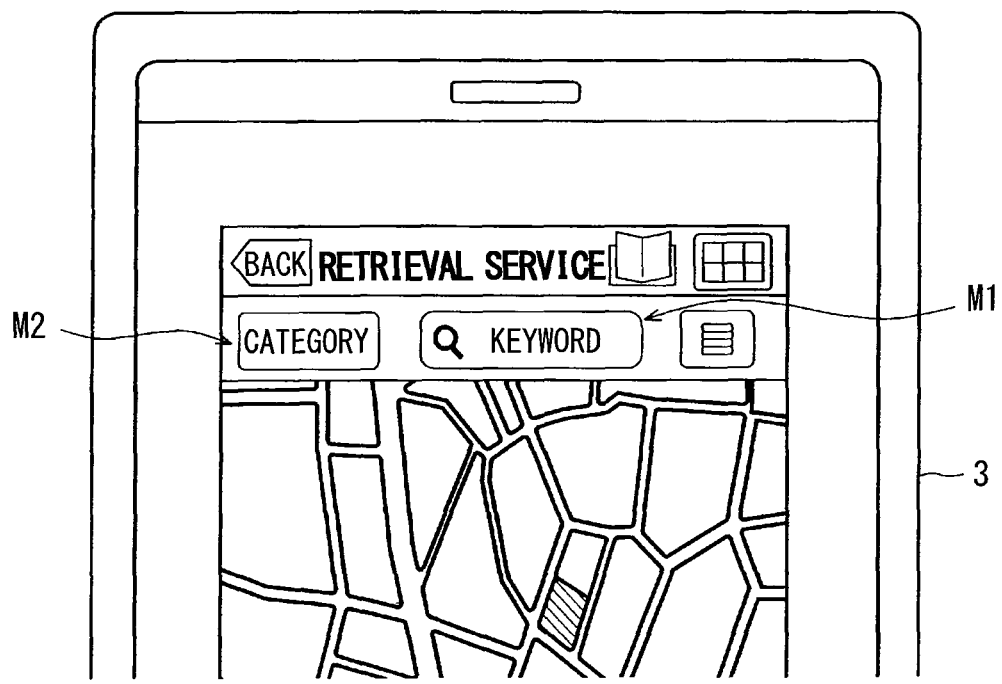
FIG. 6 is a diagram illustrating an example window displayed on the mobile communication terminal when POI retrieval service is used.

The following first describes a utilization of the retrieval service on the mobile communication terminal 3. As described above, the mobile communication terminal 3 can independently use the retrieval service. As illustrated in FIG. 6, the terminal-side display portion 21 displays a keyword button M1 (corresponding to a first terminal-side input section) and a category button M2 (corresponding to a second terminal-side input section) to use the retrieval service. When the user touches the keyword button M1, the mobile communication terminal 3 displays a software keyboard (not illustrated) on the screen and accepts a keyword, which is entered by the user according to the user's intention. The keyword inputted into the first terminal-side input section by the user according to the user's intention is also referred to as an intended keyword. Similarly to an ordinary mobile telephone, for example, the user touches the same section several times to select a character and enters characters one by one. The user can enter an intended keyword by manipulating the first terminal-side input section several times.

When the category button M2 is touched, the mobile communication terminal 3 displays an information category (classification). In this case, the mobile communication terminal 3 lists categories, such as "edible," "retail store," and "public facility." The categories such as "edible," "retail store," and "public facility" are previously defined in a category list and correspond to predetermined keywords that is selectable by the user. When the user selects one category, the mobile communication terminal 3 displays a more detailed category. For example, if the user selects "edible,", the mobile communication terminal 3 further displays subordinate categories such as "Japanese food," "western food," and "family restaurant" corresponding to subordinate keywords. For example, if the user selects "Japanese food", the mobile communication terminal 3 displays much more detailed categories such as "udon," "soba," and "sushi." The user may select "udon" as a target category for information retrieval. As described above, the user needs to perform the selection manipulation at least twice in order to select a predetermined keyword on the second terminal-side input section.

When the entering of keyword or the selection of category is performed, the mobile communication terminal 3 specifies one of the intended keyword entered into the first terminal-side input section of the terminal-side manipulation portion 22 or the predetermined keyword selected on the second terminal-side input section of the terminal-side manipulation portion 22. The mobile communication terminal 3 transmits the specified keyword as a terminal-side keyword together with the position information to the server. The server retrieves facilities corresponding to the keyword or the category within a range around the received position information.

As described above, when using the retrieval service independently, the mobile communication terminal 3 allows the user to input a keyword by entering an intended keyword using the software keyboard or by selecting one predetermined keyword using the hierarchized category for information retrieval. Thus, the user can more specifically and accurately retrieve the intended information. The independent use of the mobile communication terminal 3 mainly aims at retrieving detailed information at the expense of the manipulation time. That is, the independent use of the mobile communication terminal 3 places an importance on accurate information retrieval. This is because the user is assumed to do nothing other than the retrieval manipulation when the information retrieval is performed independently by the mobile communication terminal 3.

Acquisition of a retrieval result takes some amount of time if the vehicle device 2 performs the information retrieval in the same procedure as the independent information retrieval on the mobile communication terminal 3. Even if an intended category is selected from the hierarchized categories, some amount of time is required to acquire a retrieval result depending on the number of hierarchical levels. Namely, acquiring a detailed retrieval result is time-consuming.

To solve above-described difficulty, the vehicle device 2 according to the present embodiment uses the following configuration to shorten the time required to determine an intended retrieval item, thereby shortening the time to acquire a retrieval result.

Figure 7:
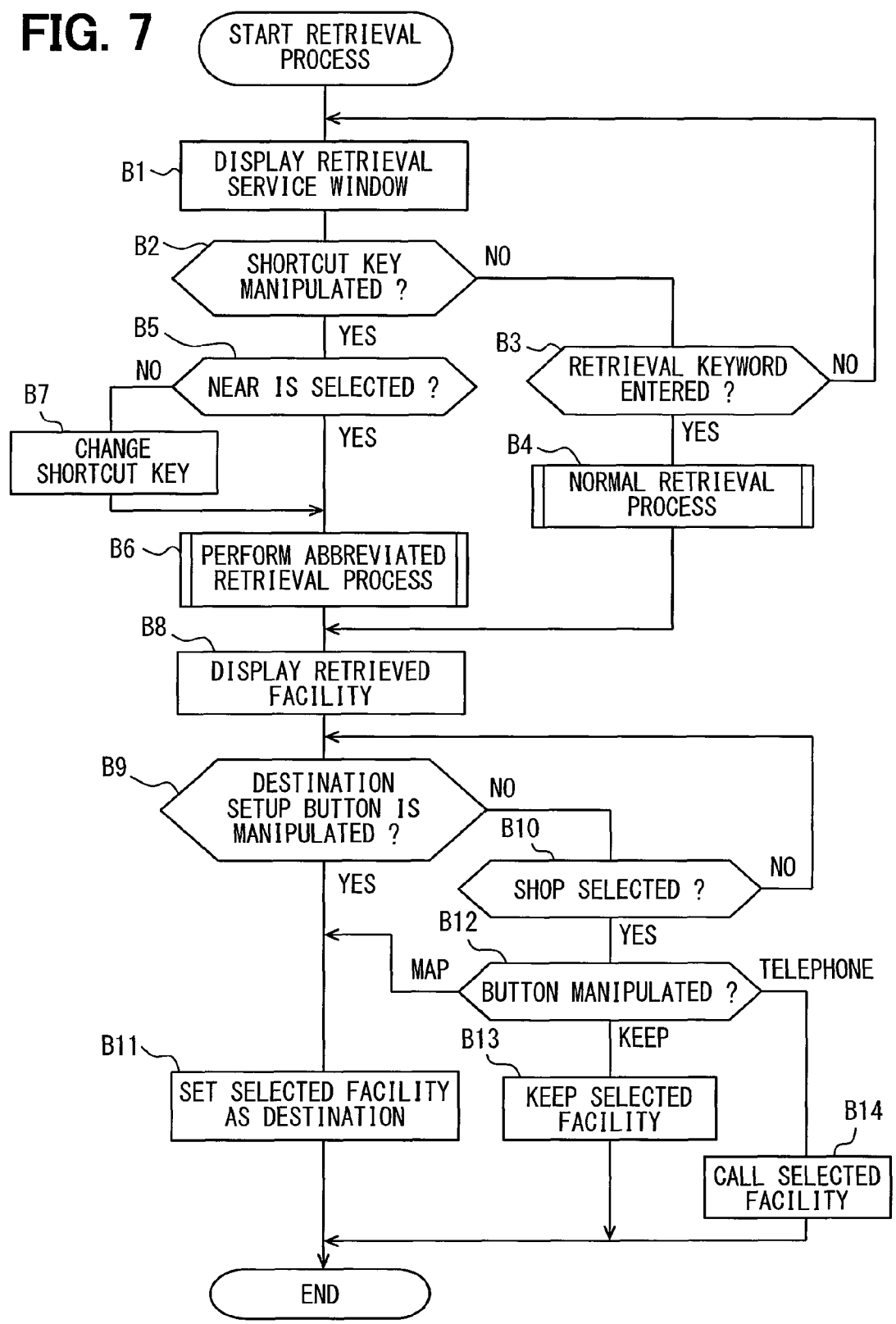
FIG. 7 is a flowchart illustrating a retrieval process performed by the vehicle device.
Figure 8:
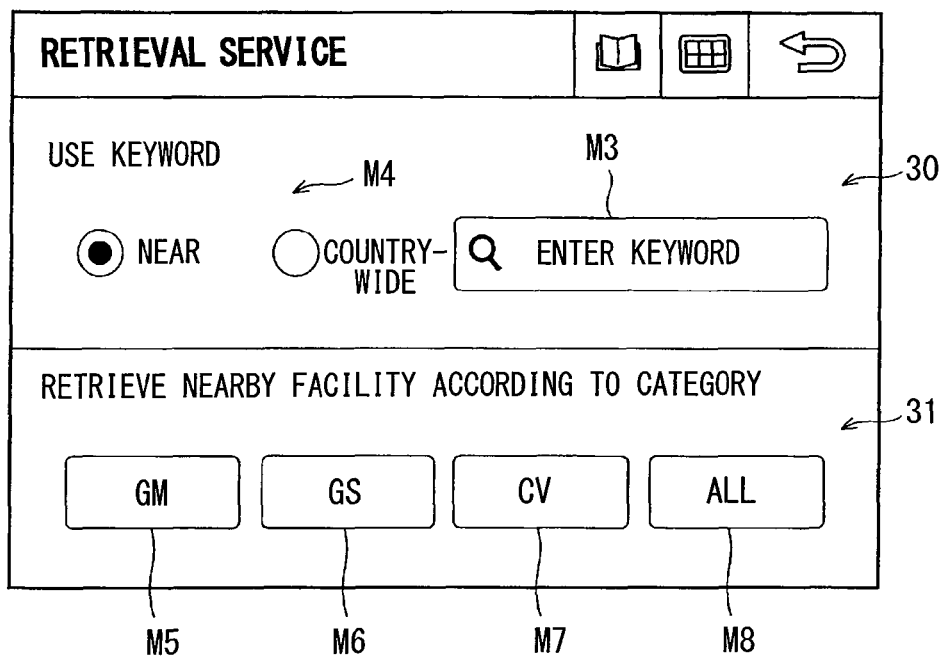
FIG. 8 is a diagram illustrating an example retrieval service window displayed on the vehicle device when POI retrieval service is used.

The vehicle device 2 performs a retrieval process illustrated in FIG. 7 in response to a touch to the icon 11 corresponding to the retrieval service on the home screen in FIG. 5. Specifically, the vehicle-side control portion 10 of the vehicle device 2 performs the retrieval process in FIG. 7. When the retrieval process starts, the vehicle-side control portion 10 allows the vehicle-side display portion 11 to display a retrieval service window (B1). The retrieval service window differs from the window (see FIG. 6) displayed on the mobile communication terminal 3, and displays the keyword display section 30 and the category display section 31 as illustrated in FIG. 8. The keyword display section 30 enables manipulation to enter a keyword for keyword-based retrieval and to allow the content server 6 to perform the retrieval using the keyword. The category display section 31 includes shortcut keys (such as edible button M5, gas station button M6, and convenience store button M7 to be described later) each assigned with a predetermined keyword that is highly likely to be used for vehicles. The display sections may also function as manipulation sections to enter a keyword for retrieval in the case of using the retrieval service. In the information retrieval system 1 according to the present embodiment, when the vehicle device 2 is manipulated instead of the mobile communication terminal 3, an instruction that indicates a use of the retrieval service is inputted to the mobile communication terminal 3. The keyword display section 30 provides the first vehicle-side input section. Each shortcut key on the category display section 31 provides the second vehicle-side input section. The vehicle-side control portion 10 displays the keyword display section 30 and the category display section 31 on the vehicle-side display portion 11. This process in which the keyword display section 30 and the category display section 31 are displayed corresponds to a display process.

The keyword display section 30 is provided with a keyword input button M3 and a retrieval range selection button M4. The keyword input button M3 is used to enter a keyword (hereinafter also referred to as an intended keyword). The retrieval range selection button M4 sets a retrieval target range as one of near the position (vehicle position) or countrywide. FIG. 4 shows that the retrieval range is set as "near." By touching the keyword input button M3, the user can enter an intended keyword according to the user's intention to perform the information retrieval, which is similar to the information retrieval performed on mobile communication terminal 3 as described above.

The category display section 31 includes the shortcut keys (edible button M5, gas station button M6, and convenience store button M7) provided with respective predetermined keywords. The edible button M5 is assigned "GM" as a keyword symbol. The gas station button M6 is assigned "GS" as a keyword symbol. The convenience store button M7 is assigned "CV" as a keyword symbol. Each shortcut key is preliminarily assigned with a keyword that is frequently used by a user in the vehicle. The keywords may further include an interchange and a roadside station, for example. A keyword assumed to be highly frequently used for vehicles is also referred to as a highly frequent keyword.

An all-keyword button M8 is assigned "ALL." This button functions as a category button to perform the category-based retrieval similarly to the category button M2 on the mobile communication terminal 3 as described above.

When the above-mentioned retrieval service window is displayed, the vehicle device 2 performs the retrieval process in FIG. 7, and determines whether a shortcut key is manipulated (B2) or determines whether the keyword input button M3 is touched (B3). When neither manipulation is confirmed (B2: NO and B3: NO), the vehicle device 2 waits until either manipulation is confirmed. Though not illustrated, the vehicle device 2 terminates the retrieval process if the user manipulates the vehicle device 2 to terminate the retrieval process or to start another application. The process that accepts the user's manipulation corresponds to a manipulation acceptance process.

When the keyword input button M3 is manipulated (B3: YES), the vehicle device 2 performs a normal retrieval process (B4). During the normal retrieval process illustrated in FIG. 9, the vehicle device 2 displays a software keyboard (C1) and determines whether the user has completed entering of an intended keyword (C2). If the intended keyword input is incomplete (C2: NO), the vehicle device 2 accepts the intended keyword input until it is completed. If the intended keyword input is completed (C2: YES), the vehicle device 2 transmits the entered intended keyword as a vehicle-side keyword to the mobile communication terminal 3 (C3). The mobile communication terminal 3 transmits the received vehicle-side keyword to the content server 6 (via the intermediate server 5 in the present embodiment) to acquire the information using the retrieval service. The vehicle device 2 receives a retrieval result from the content server 6 via the mobile communication terminal 3 (C4). The vehicle device 2 then returns to the retrieval process in FIG. 7 and displays the retrieval result, such as a retrieved facility (B8). The transmitting of a keyword to the content server 6 and displaying an acquired retrieval result from the content server 6 correspond to a retrieval result display process.

As described above, the vehicle device 2 is capable of performing information retrieval using the keyword input, similar to the mobile communication terminal 3. However, the information retrieval using the keyword input requires several times of manipulations, which are dependent on the number of input characters. This retrieval is time-consuming and is therefore unfavorably recommended during a driving of the vehicle. To solve this problem, though not illustrated, the vehicle device 2 may acquire, via the vehicle information acquisition portion 17 from the ECU 7, the vehicle information (e.g., vehicle speed) that indicates whether the vehicle is traveling or not. If the vehicle is traveling, the vehicle device 2 inhibits the above-mentioned keyword-based retrieval. More specifically, while the vehicle is traveling, the vehicle device 2 inhibits the use of all or part of the retrieval service if the time required to complete the manipulation for the use of the retrieval service is estimated to exceed a predetermined reference time (e.g., eight seconds). To inhibit the keyword-based retrieval, the vehicle device 2 according to the present embodiment dims the keyword display section 30 and disables the keyword display section 30 from accepting the touch manipulation on the retrieval service window illustrated in FIG. 8. In this manner, the vehicle device 2 ensures the safety during the driving of the vehicle. The above-mentioned reference time provides an example value and is not limited thereto.

When all of the retrieval services are inhibited, user convenience may excessively be degraded. Regarding this difficulty, the vehicle device 2 enables the retrieval service using shortcut keys.

When a shortcut key is manipulated to directly select one highly frequent keyword assigned to the shortcut key (B2: YES) and "near" is selected by the retrieval range selection button M4 (B5: YES), the vehicle device 2 performs an abbreviated retrieval process (B6). In the abbreviated retrieval process illustrated in FIG. 10, the vehicle device 2 transmits the highly frequent keyword preliminarily assigned to the manipulated shortcut key as a vehicle-side keyword to the mobile communication terminal 3 (D1). Since the retrieval range selection button M4 selects "near," the vehicle device 2 also transmits the position detected by the vehicle-side position detection portion 14 to the mobile communication terminal 3. The mobile communication terminal 3 transmits the highly frequent keyword assigned to the shortcut key together with the vehicle position to the content server 6. The content server 6 performs retrieval operation using the vehicle-side keyword as a retrieval target within the predetermined retrieval range based on the vehicle position. The content server 6 transmits the retrieval result to the vehicle device 2 via the mobile communication terminal 3. The vehicle device 2 acquires the retrieval result from the content server 6 via the mobile communication terminal 3 (D2). The vehicle device 2 then returns to the retrieval process in FIG. 7 and displays the retrieval result, such as a retrieved facility (D8). The process of transmitting the vehicle-side keyword and displaying the acquired retrieval result correspond to the retrieval result display process.

Figure 11:
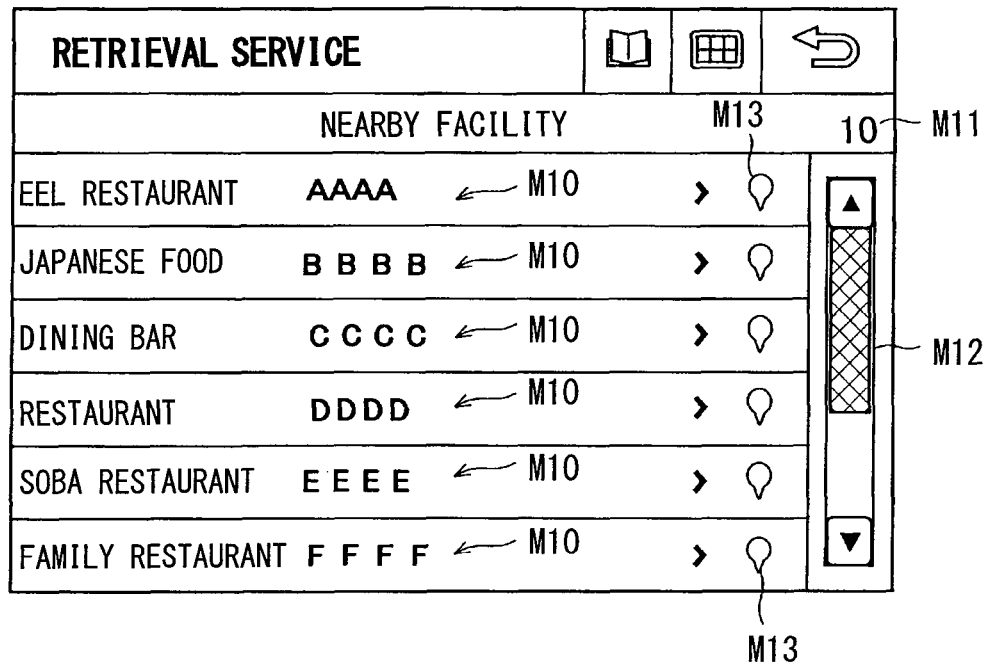
FIG. 11 is a diagramming illustrating an example retrieval result window displayed on the vehicle device.

The following will describe a specific example. As illustrated in FIG. 11, when the edible button M5 is manipulated on the retrieval service window in FIG. 8, the vehicle device 2 displays a retrieval result window including a list of eating facilities near the position. The retrieval result window includes a shop name display section M10, a result count display section M11, and a scroll bar M12. The shop name display section M10 displays edible types and shop names such as "eel restaurant," "Japanese food," "dining bar," for example. The result count display section M11 displays the number of retrieved information items, such as the number of shops (10 shops in FIG. 11). The scroll bar M12 scrolls the list of retrieval results. When determining that the vehicle is traveling, the vehicle device 2 according to the present embodiment inhibits manipulation of the scroll bar M12, though not illustrated.

As described above, the shortcut key is assigned with the highly frequent keyword that is preliminarily determined. When the shortcut key is touched, the vehicle device 2 transmits the highly frequent keyword to the content server 6. The vehicle device 2 thereby allows the content server 6 to perform information retrieval using the highly frequent keyword and acquires and displays a retrieval result. Thus, the use of the retrieval service require substantially fewer manipulations and less time than the case where an intended keyword is entered into the keyword display section 30 to use the retrieval service or the case where the mobile communication terminal 3 is independently used to use the retrieval service as described above.

When the retrieval service window is displayed, the vehicle device 2 determines whether a destination setup button M13 (to be described) is manipulated (B9) or determines whether the shop name display section M10 is touched (B10) during the retrieval process illustrated in FIG. 7. The user is highly possible to use a retrieved facility in a short period of time when the user retrieves facilities around the vehicle position by using the retrieval service onboard. For example, when the user retrieves eating facilities near the position (i.e., the current vehicle position), it is considered that the user uses the retrieval service in order to have a meal.

As illustrated in FIG. 11, the vehicle device 2 displays the destination setup button M13 in association with the retrieved information such as a shop name. In this case, the content server 6 includes the position information capable of specifying the shop position transmits in the retrieval result, and transmits the retrieval result to the vehicle device 2.

Figure 12:
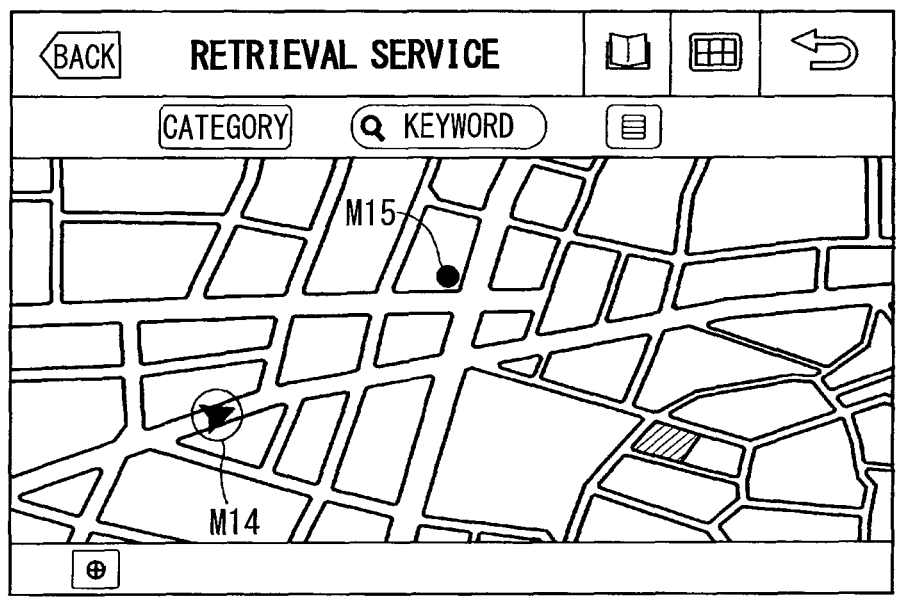
FIG. 12 is a diagram illustrating an example display window on the vehicle device to specify a destination.

Suppose that the destination setup button M13 corresponding to "eel restaurant AAAA" is touched. In this case, according to the retrieval process in FIG. 7, since the destination setup button M13 is manipulated (B9: YES), the vehicle device 2 sets the selected facility as the destination (B11). The vehicle device 2 then displays a map display window as illustrated in FIG. 12. The map window includes a vehicle position M14 and a retrieved facility M15 set as the destination. The vehicle device 2 may perform route guidance to the destination as a part of retrieval service function. Alternatively, the vehicle device 2 may transfer the route guidance to a navigation function (e.g., by notifying the destination information to the navigation function).

Figure 13:
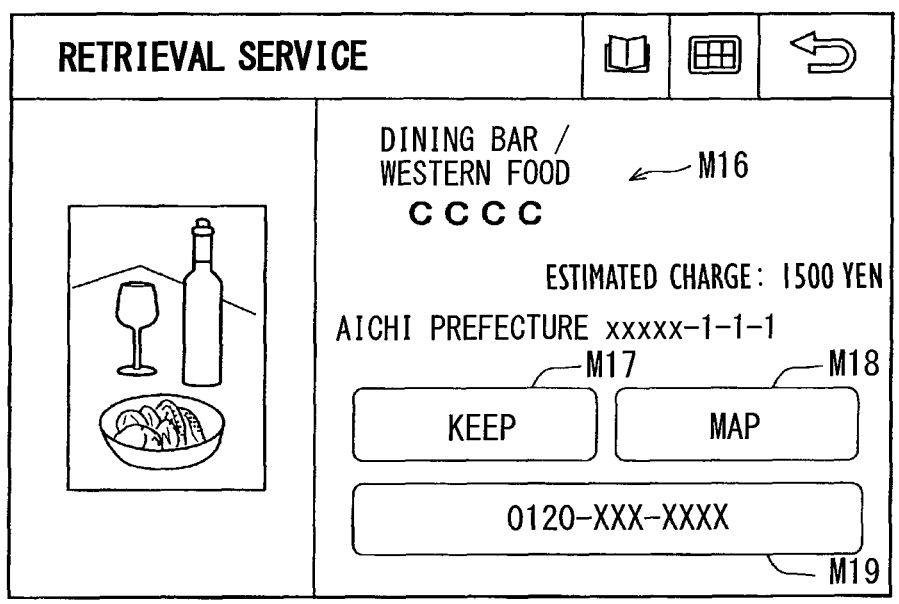
FIG. 13 is a diagram illustrating an example detailed facility window displayed on the vehicle device.

The user may touch the shop name display section M10 corresponding to "dining bar CCCC" to select a shop (YES at B10). In this case, the vehicle device 2 displays a detailed facility window as illustrated in FIG. 13. The detailed facility window includes a detailed information display section M16, a map button M17, a keep button M18, and a telephone button M19. The detailed information display section M16 displays a facility name (e.g., shop name), image data included in the retrieval result, the facility address, and an estimated average charge. Similar to the above-mentioned destination setup button M13, the user may set the retrieval facility as the destination using the map button M17. The keep button M18 keeps the facility as favorite information. The telephone button M19 enables making of telephone call to the facility.

Figure 14:
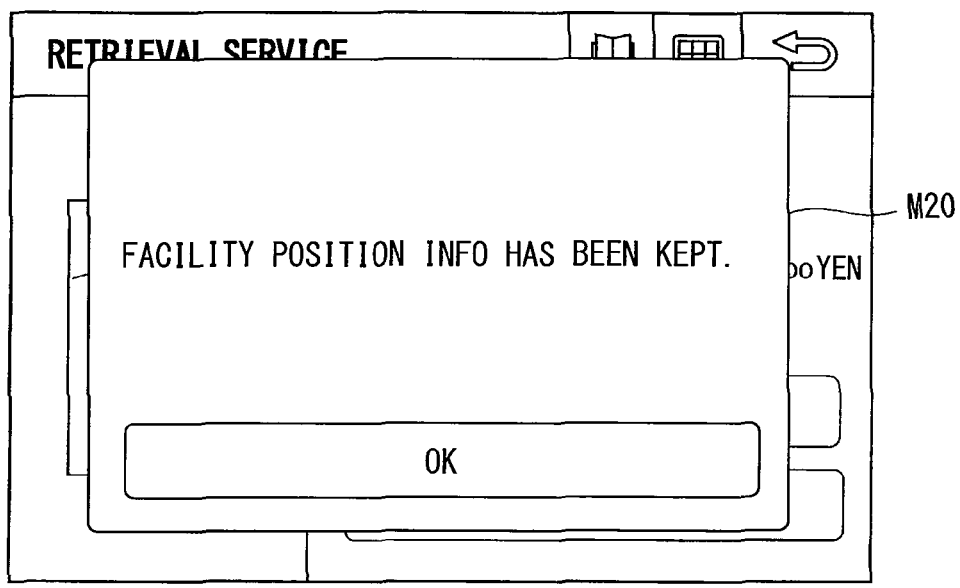
FIG. 14 is a diagram illustrating an example spot keep window displayed on the vehicle device.

During the retrieval process illustrated in FIG. 7, the vehicle device 2 may wait until one of the buttons is manipulated (B12). For example, the user may touch the map button M17 (B12: MAP). In this case, the vehicle device 2 proceeds to B11 and sets the facility as a destination. Alternatively, the keep button M18 may be touched to keep the information (B12: KEEP). In this case, the vehicle device 2 displays a keep message M20 as illustrated in FIG. 14 to notify that the information has been kept. The vehicle device 2 thereby stores (keeps) the facility (e.g., CCCC) as favorite information (B13).

Figure 15:
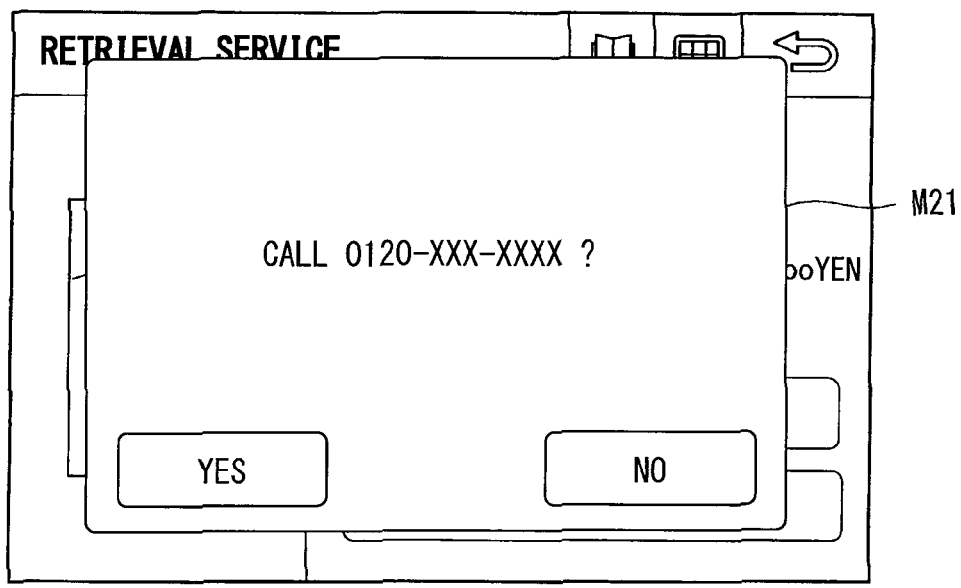
FIG. 15 is a diagram illustrating an example telephone window displayed on the vehicle device.

At B12 in FIG. 7, when the telephone button M19 is touched (B12: TELEPHONE), the vehicle device 2 displays a telephone message M21 to inquire whether to make a telephone call to the facility (B14) as illustrated in FIG. 15. In this case, the telephone call is made via handsfree operation. In the present embodiment, the vehicle device 2 inhibits manipulation of the keep button M18 and the telephone button M19 while the vehicle is traveling. This is because when these buttons are manipulated, the user may highly possibly gaze at the display screen in order to confirm a large amount of visual information, or a long time is required to complete the process.

Though not illustrated in FIG. 7, when the all-keywords button M8 is manipulated on the retrieval service window shown in FIG. 8, the vehicle device 2 displays a keyword list window as illustrated in FIG. 16(*a*). The vehicle device 2 enables the retrieval using keywords other than the highly frequent keywords assigned to the shortcut keys. In the present embodiment, the vehicle device 2 inhibits manipulation of the all-keywords button M8 while the vehicle is traveling. This is because the retrieval using the all-keywords button M8 requires the longer time than the retrieval using the shortcut keys.

Figures 16A, 16B:
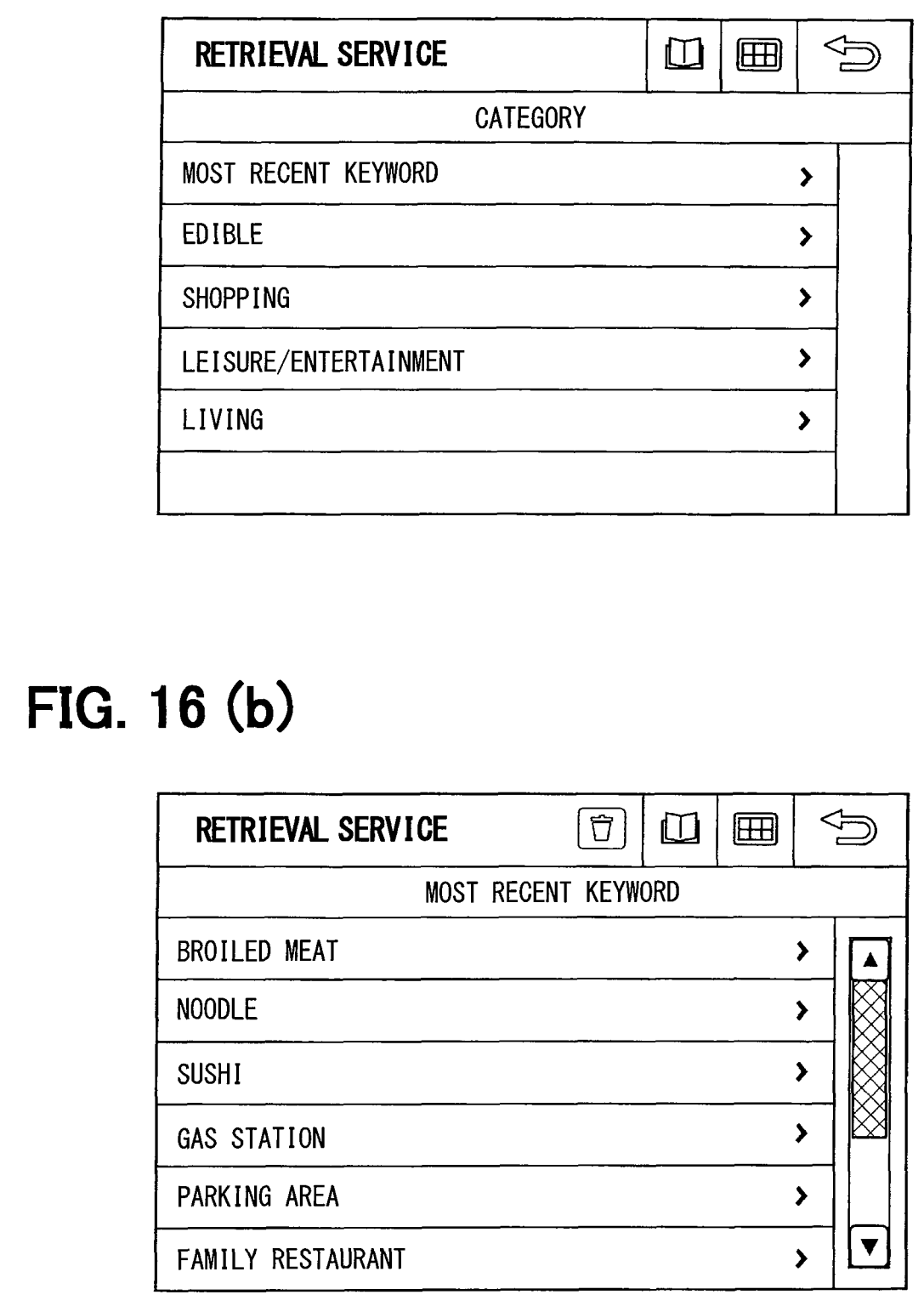

The keyword list window displays "most recent keywords" including the history of keywords used by the user most recently and other keywords such as "edible," "shopping," and "leisure, entertainment". More specifically, the keyword list window displays top categories of information managed in the content server 6. A scroll bar is displayed if top categories are too many to be arranged in the display screen. When the user selects "edible" as a top category, for example, the vehicle device 2 displays sub-categories as illustrated in FIG. 16(b). In this case, the vehicle device 2 displays "broiled meat," "noodle," and "sushi" as sub-categories of "edible." The user can thereby perform the retrieval by selecting keywords other than the highly frequent keywords assigned to the shortcut keys.

As described above, the vehicle device 2 displays the shortcut keys to enable the use of the retrieval service while the vehicle is traveling.

The above-mentioned embodiment can provide the following advantages.

In the information retrieval system 1, the vehicle device 2 transmits a vehicle-side keyword specified by the vehicle-side manipulation portion 12 to the mobile communication terminal 3. The vehicle-side manipulation portion 12 includes the keyword input button M3 (corresponding to the first vehicle-side input section) to enter an intended keyword for using the retrieval service and the shortcut keys M5 through M7 (corresponding to the second vehicle-side input section) assigned with the highly frequent keywords. The vehicle-side keyword corresponds to one of the intended keyword entered from the first vehicle-side input section or the highly frequent keyword selected from the second vehicle-side input section. The vehicle device 2 instructs the mobile communication terminal 3 to perform the retrieval service based on the vehicle-side keyword transmitted to the mobile communication terminal 3. The vehicle device 2 receives a retrieval result from the content server 6 via the mobile communication terminal 3 and displays the retrieval result on the vehicle-side display portion 11. The retrieval service use with the vehicle device 2 differs from the retrieval service use independently with the mobile communication terminal 3. That is, the screen displays and the manipulation to specify a keyword in the retrieval service use with the vehicle device 2 and in the retrieval service use with the mobile communication terminal 3 are different from each other. More specifically, the vehicle device 2 can directly specify a vehicle-side keyword by single manipulation on one of the shortcut keys M5 through M7. The vehicle device 2 acquires a retrieval result by a small number of manipulations and a short period of time compared with the mobile communication terminal 3 that independently uses the retrieval service. Thus, when using the retrieval service on the vehicle device 2, the user can pay less time to gaze at the display screen, and driving safety can be ensured even if the retrieval service is used during the traveling of vehicle.

The vehicle device 2 acquires, from the vehicle information acquisition portion 17, the vehicle information based on which the traveling state or stationary state of the vehicle can be determined. When determining that the vehicle is traveling, the vehicle device 2 inhibits the use of all or part of the service. The information retrieval system 1 according to the present embodiment inhibits input manipulation from the keyword input button M3, but allows input manipulation from the shortcut keys M5 through M7. This can prevent excessive limitation on the use of the retrieval service and improve the convenience when using the retrieval service.

When the process time required to complete the process for using the retrieval service is estimated to exceed a predetermined reference time, the vehicle device 2 inhibits manipulation of the keep button M18 or the telephone button M19 even if the category display section 31 is used for input. This can further ensure the safety of driving.

The vehicle device 2 or the mobile communication terminal 3 transmits the position information indicating the current position of the vehicle together with the keyword to the content server 6. The vehicle device 2 or the mobile communication terminal 3 acquires, from the content server 6, a retrieval result that is searched within a specified range with reference to the position specified by the position information. The user can thereby acquire information such as a facility around the vehicle position, more specifically, the current position of the vehicle.

If a facility is specified as a retrieval target, the information retrieval system 1 receives a retrieval result from the content server 6 under the condition that the retrieval result includes position information capable of specifying the position of the facility. The vehicle device 2 can set the facility included in the retrieval result as a destination. This can save the time to set a destination, improve the convenience of the retrieval service, increase situations in which the retrieval service can be used, and acquire new users.

Manipulation on the mobile communication terminal 3 is inhibited when the mobile communication terminal 3 is brought into the vehicle and is connected to the vehicle device 2. This can prevent the mobile communication terminal 3 from being manipulated while the user is driving the vehicle. Therefore, the driving safety is further improved.

The information retrieval system 1 preliminarily determines keyword assigned to the shortcut key based on the information category. This configuration can save the user's time and effort when selecting the keyword. Thus, the time to manipulate the vehicle device 2 for use of the retrieval service can be shortened and driving safety is further improved.

Figure 9:
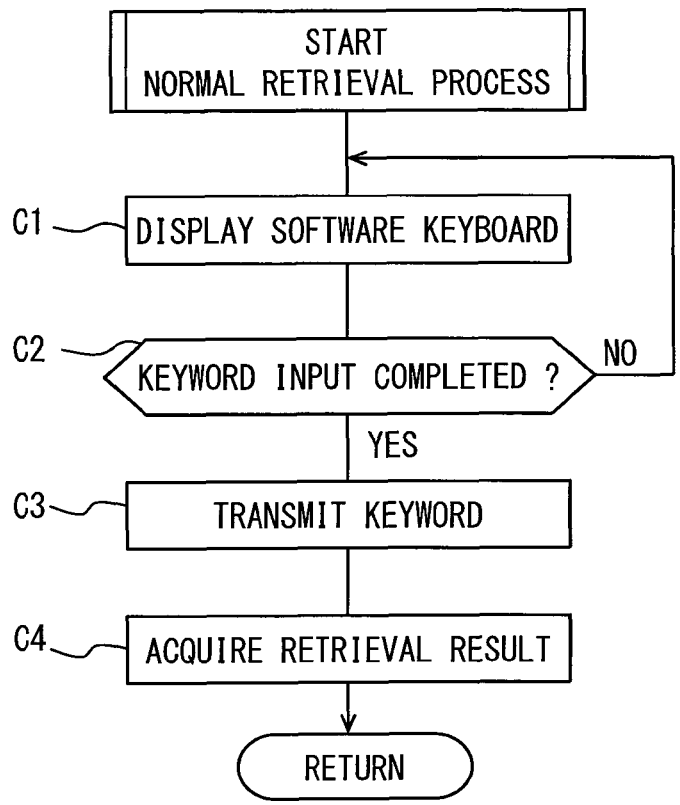
FIG. 9 is a flowchart illustrating an abbreviated retrieval process performed by the vehicle device.
Figure 10:
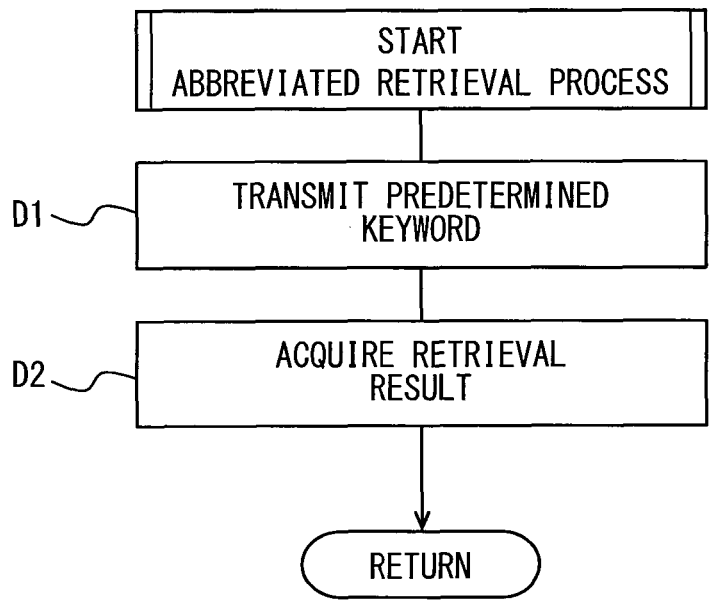
FIG. 10 is a flowchart illustrating a normal retrieval process performed by the vehicle device.

Above described effects are provided by executing an information retrieval program that performs the processes as illustrated in FIGS. 7, 9, and 10 on the vehicle device 2. The information retrieval program to perform the processes as illustrated in FIGS. 7, 9, and 10 may also be available as a program product. The program product includes instructions to be executed by a computer and can be stored in a non-temporary, tangible, and computer-readable storage medium.

Second Embodiment

The second embodiment of the present disclosure will be described with reference to FIGS. 18 and 19. In the second embodiment, a use of the mobile communication terminal is different from the first embodiment.

As described in the foregoing embodiment, the mobile communication terminal 3 is capable of independently providing various services including the retrieval service. More specifically, the mobile communication terminal 3 may execute an application to cooperate with the vehicle device 2. In this case, the mobile communication terminal 3 can provide various services regardless of whether the mobile communication terminal 3 is connected to the vehicle device 2 or not.

Figure 18:
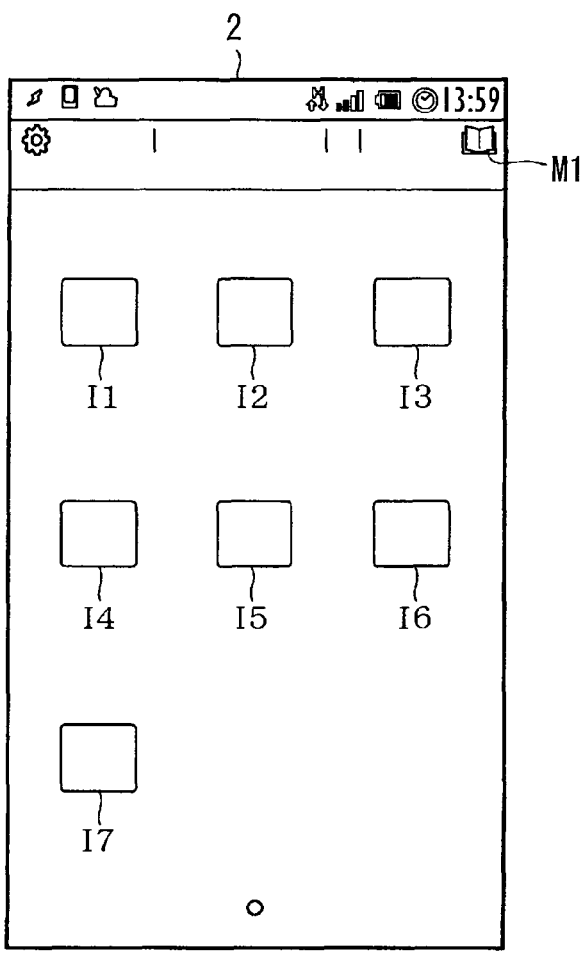
FIG. 18 is a diagram illustrating an example home screen on the mobile communication terminal according to a second embodiment.
Figure 19:
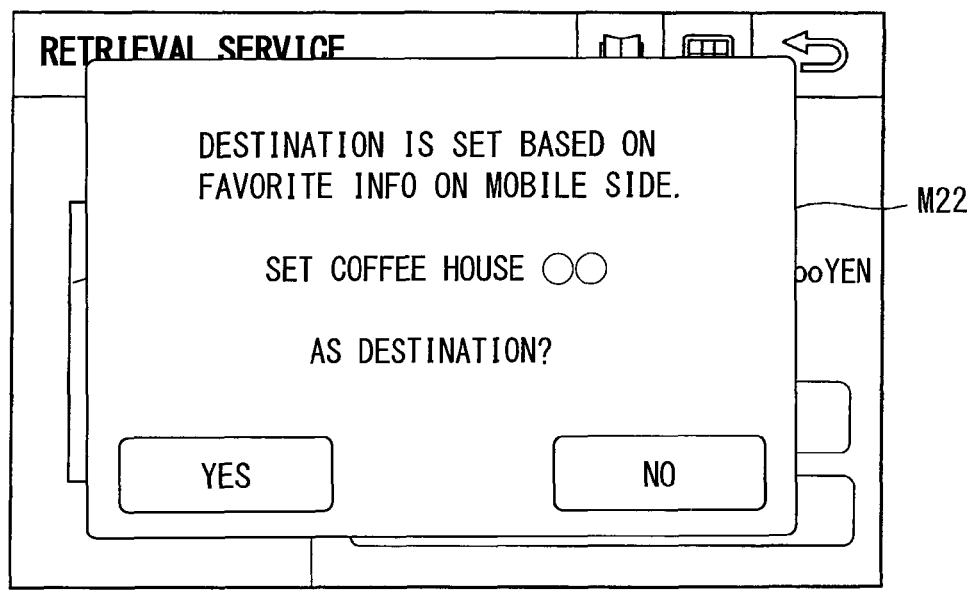
FIG. 19 is a diagram illustrating an example destination specification window displayed on the vehicle device.

When the mobile communication terminal 3 is not connected to the vehicle device 2, the mobile communication terminal 3 displays a home screen as illustrated in FIG. 18 in response to a start of a cooperation application that activates a cooperation of the mobile communication terminal 3 with the vehicle device 2. The home screen is similar to that for the vehicle device 2 as illustrated in FIG. 5 and includes icons I1 through I8 corresponding to available services. The user can use an intended service (see FIG. 1) by touching one of the icons I1 through I8.

Suppose a case of using the retrieval service similarly to the first embodiment. The user may touch the icon I1 corresponding to the retrieval service. The mobile communication terminal 3 then displays the retrieval window illustrated in FIG. 6. As described above, the retrieval window displays the keyword button M1 and the category button M2. When the category button M2 is touched, the mobile communication terminal 3 displays hierarchized categories. When executing the application to cooperate with the vehicle device 2, the mobile communication terminal 3 displays the category button M2 that enables information retrieval using fewer procedures than the information retrieval by entering intended keyword.

Compared with the information retrieval by entering the intended keyword, the user can use the retrieval service with fewer manipulations by selecting the category. As a retrieval result, the mobile communication terminal 3 displays a list of retrieval results as illustrated in FIG. 11 or the detailed information as illustrated in FIG. 13.

The mobile communication terminal 3 can process a retrieval result similar to the vehicle device 2 according to the first embodiment. The mobile communication terminal 3 can register the acquired retrieval result as favorite information or set the retrieved facility as a destination. The content server 6 stores the registered favorite information. A destination can be selected from the favorite information registered in the past. The vehicle device 2 can also refer to the information registered by the mobile communication terminal 3.

Since the mobile communication terminal 3 is capable of cooperating with the vehicle device 2, a destination set on the mobile communication terminal 3 may also be set on the vehicle device 2. When the vehicle device 2 is connected to the mobile communication terminal 3 on which a destination is set, the vehicle device 2 may display a message M22 inquiring whether to set the destination as the destination set on the mobile communication terminal 3 as illustrated in FIG. 19. The vehicle device 2 accepts the user manipulation to determine whether to acknowledge the setting of the destination. If the destination is acknowledged, the vehicle device 2 displays the map window as illustrated in FIG. 12. Then, the vehicle device 2 guides the vehicle to the destination by, for example, transferring the guidance process to the navigation function.

The mobile communication terminal 3 can independently use various services. For example, the user can retrieve a destination before boarding and, soon after boarding, specify the retrieved destination as an intended destination with a single touch of a button.

The first embodiment inhibits manipulation of the mobile communication terminal 3 when it is connected to the vehicle device 2. Alternatively, manipulation of the mobile communication terminal 3 may not be inhibited. This is because excessively inhibiting the manipulation degrades the convenience of using the service if the owner of the mobile communication terminal 3 is not a driver of the vehicle. In consideration of the safety, it may be favorable to identify whether the owner of the mobile communication terminal 3 is a driver when the mobile communication terminal 3 is connected to the vehicle device 2. For example, the mobile communication terminal 3 may prompt the user to identify whether the user is a driver when the mobile communication terminal 3 is connected to the vehicle device 2. As another example, when the mobile communication terminal 3 connected to the vehicle device 2 is a preliminarily registered mobile communication terminal, the user of the mobile communication terminal 3 may be determined as the driver and manipulation on the mobile communication terminal 3 may be inhibited.

Further, manipulation on a mobile communication terminal 3 owned by a passenger may be excluded from an inhibition target. With this configuration, the passenger can set a destination, which is retrieved by the above-mentioned retrieval service or stored in the mobile communication terminal 3, on the vehicle device 2 even while the vehicle is traveling. With this configuration, the convenience of using the service is improved.

Other Embodiments

The keywords, facility names, and categories described in the foregoing embodiments are described as examples. The keywords, facility names, and categories described in the foregoing embodiments are not limited to the described examples.

The foregoing embodiments provide the example of a retrieval range near (around) the current position of the vehicle. Alternatively, the retrieval range may be set based on, but not limited to, "countrywide" as illustrated in FIG. 8 or a user-specified destination under a condition that the content server 6 is capable of retrieving information within a predetermined range based on a specified position. When the specified position is equal to countrywide, the keyword assigned to the shortcut key may be changed. For example, keyword "GS" in FIG. 8 may be replaced by "sightseeing area", "CV" may be replaced by "colorful autumn leaves spot." This can prevent retrieval against user's intention, such as retrieving convenience stores across the country.

As the position to perform the retrieval, a destination may be set in addition to the current vehicle position, and information including at least the destination position may be transmitted to the content server 6 to perform the information retrieval within a retrieval range based on the destination. With this configuration, information around the destination can be retrieved. For example, the retrieval range may include "places for day trip" or "places accessible in three hours" with reference to the current vehicle position. Destinations can be specified on the mobile communication terminal 3 as well as the vehicle device 2.

A change portion may be provided to enable the user to change the highly frequent keyword assigned to the shortcut key.

The content server 6 connected to each keyword assigned to the shortcut key may be set differently for different keywords. The network 4, or more specifically, the Internet includes specific content servers such as the content servers 6a and 6b. For example, the content server 6a may specifically provide contents concerning edible information. The content server 6b may specifically provide information related to vehicles. For example, the content server 6a may be connected to acquire information when the user selects the shortcut key (corresponding to the first sub-input section) assigned with the keyword "GM" (corresponding to the first keyword). The content server 6b may be connected to acquire information when the user selects "vehicle" (corresponding to the second sub-input section). By changing the content server 6 according to keywords, great amount of information and more up-to-date information can be provided to the user. When multiple shortcut keys are provided as illustrated in FIG. 8, the content server 6 to be connected may be set differently according to the keyword assigned to each of the shortcut keys (corresponding to the sub-input section) as the second vehicle-side input section. The description of the first and second keywords is used for identifying different types of keywords, but does not limit the number of keywords.

The vehicle device 2 or the mobile communication terminal 3 may previously establish the correspondence between the content server 6 to be connected and the keyword assigned to the shortcut key, and may specify the content server to be connected when transmitting the keyword. Alternatively, the intermediate server may previously establish the correspondence between the content server 6 to be connected and the keyword, and may specify the content server 6 to be connected according to the keyword transmitted from the vehicle device 2 or transmitted from the mobile communication terminal 3.

In the foregoing embodiments, Bluetooth (registered trademark) communication is described as a wireless communication system between the vehicle device 2 and the mobile communication terminal 3. But the wireless communication is not limited Bluetooth. For example, the communication system may be provided by other wireless communication systems such as wireless LAN including WiFi and wireless USB as well as wired communication systems such as USB.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. An information retrieval system comprising:
a mobile communication terminal that independently performs a retrieval service provided by a server that is placed outside a vehicle; and
a vehicle device that is equipped to the vehicle and operates in cooperation with the mobile communication terminal to perform the retrieval service via the mobile communication terminal,
wherein the vehicle device includes:
a vehicle-side display portion that displays information related to the retrieval service;
a vehicle-side manipulation portion that has a first vehicle-side input section and a second vehicle-side input section, wherein the first vehicle-side input section enables an input of an intended keyword to be searched by multiple times of user manipulation, the second vehicle-side input section is preliminarily assigned with a frequently used keyword and enables an input of the frequently used keyword directly by single time of user manipulation, and the frequently used keyword is a keyword that is frequently used by a user in the vehicle; and
a vehicle-side control portion that executes a retrieval process based on a vehicle-side keyword that corresponds to one of the intended keyword inputted via the vehicle-side manipulation portion or the frequently used keyword inputted via the vehicle-side manipulation portion,
wherein the vehicle-side control portion transmits the vehicle-side keyword to the mobile communication terminal during the retrieval process, controls the mobile communication terminal to retrieve information related to the vehicle-side keyword by performing the retrieval service, acquires a retrieval result from the server via the mobile communication terminal, and controls the vehicle-side display portion to display the retrieval result as the information related to the retrieval service, and
wherein the mobile communication terminal includes:
a terminal-side display portion that displays information related to the retrieval service;
a terminal-side manipulation portion that has a first terminal-side input section and a second terminal-side input section, wherein the first terminal-side input section enables an input of the intended keyword to be searched by multiple times of user manipulation, the second terminal-side input section enables an input of a predetermined keyword by at least two times of user manipulation; and
a terminal-side control portion that transmits, to the server, a terminal-side keyword corresponding to one of the intended keyword inputted via the terminal-side manipulation portion or the predetermined keyword inputted via the terminal-side manipulation portion, acquires a retrieval result transmitted from the server, and controls the terminal-side display portion to display the retrieval result as the information related to the retrieval service;
wherein, when a case in which the vehicle device performs the retrieval service by executing the retrieval process based on the vehicle-side keyword inputted to the second vehicle-side input section is compared with a case in which the mobile communication terminal independently performs the retrieval service based on the terminal-side keyword inputted to the terminal-side manipulation portion, a quantity of the user manipulation performed on the second vehicle-side input section of the vehicle device is less than a quantity of the user manipulation performed on the terminal-side manipulation portion of the mobile communication terminal.

2. The information retrieval system according to claim 1,
wherein the multiple times of user manipulation on one of the first vehicle-side input section or the first terminal-side input section is a typing manipulation for entering characters included in the intended keyword one by one according to an intention of the user using one of the first vehicle-side input section or the first terminal-side input section,
wherein the single time of user manipulation on the second vehicle-side input section is a selection manipulation for directly selecting the frequently used keyword assigned to the second vehicle-side input section, and
wherein at least two times of user manipulation on the second terminal-side input section is a selection manipulation for selecting the predetermined keyword in a stepwise manner using the second terminal-side input section.

3. The information retrieval system according to claim 1,
wherein the vehicle device further includes a vehicle information acquisition portion that acquires vehicle information indicating whether a vehicle is in a traveling state,
wherein the vehicle-side control portion determines, based on the vehicle information, whether the vehicle is in the traveling state, and
wherein, when the vehicle-side control portion determines that the vehicle is in the traveling state, the vehicle-side control portion inhibits a part or all of functions of the retrieval service.

4. The information retrieval system according to claim 3,
wherein the vehicle-side control portion inhibits the user manipulation on the first vehicle-side input section and permits the user manipulation on the second vehicle-side input section.

5. The information retrieval system according to claim 1,
wherein the vehicle-side control portion transmits information of a position related to the vehicle together with the vehicle-side keyword to the server and acquires the retrieval result from the server via the mobile communication terminal, and
wherein the vehicle-side control portion receives, as the retrieval result, information related to an area that is within a specified range of the position related to the vehicle.

6. The information retrieval system according to claim 1, wherein the vehicle-side control portion transmits, to the server, information of a current position of the vehicle or information of a destination position of the vehicle as the information of the position related to the vehicle.

7. The information retrieval system according to claim 1, further comprising:
a change portion that changes the frequently used keyword assigned to the second vehicle-side input section to a different frequently used keyword.

8. The information retrieval system according to claim 1,
wherein a facility category is assigned to the second vehicle-side input section as the frequently used keyword.

9. The information retrieval system according to claim 1,
wherein the server includes a plurality of sub-servers including a first sub-server and a second sub-server,
wherein the second vehicle-side input section has a plurality of sub-input sections including a first sub-input section and a second sub-input section,
wherein the first sub-input section is assigned with a first keyword as the frequently used keyword and the second sub-input section is assigned with a second keyword different from the first keyword as the frequently used keyword,
wherein the vehicle-side control portion acquires the retrieval result corresponding to the first keyword from the first sub-server in response to a selection of the first keyword via the first sub-input section, and
wherein the vehicle-side control portion acquires the retrieval result corresponding to the second keyword from the second sub-server in response to a selection of the second keyword via the second sub-input section.

10. The information retrieval system according to claim 9, further comprising
an intermediate server,
wherein the server is connected to a plurality of content providers and each of the content providers provides the server with a content including an application program and data to provide a specified service,
wherein, when the content providers provide contents having different data formats via the server, the intermediate server converts the different data formats of the contents into a unified data format,
wherein the intermediate server acquires the retrieval result corresponding to the first keyword from the first sub-server in response to the selection of the first keyword via the first sub-input section, and
wherein the intermediate server acquires the retrieval result corresponding to the second keyword from the second sub-server in response to the selection of the second keyword via the second sub-input section.

11. The information retrieval system according to claim 1,
wherein, during a connected state of the mobile communication terminal with the vehicle device, the terminal-side control portion inhibits a part or all of manipulations performed by the user on the terminal-side manipulation portion.

12. A vehicle device applied in the information retrieval system according to claim 1, the vehicle device being equipped to a vehicle and connected with a mobile communication terminal that independently performs a retrieval service, the vehicle device comprising:
a vehicle-side display portion that displays information related to the retrieval service;
a vehicle-side manipulation portion that has a first vehicle-side input section and a second vehicle-side input section, wherein the first vehicle-side input section enables an input of an intended keyword to be searched by multiple times of user manipulation, the second vehicle-side input section is preliminarily assigned with a frequently used keyword and enables an input of the frequently used keyword directly by single time of user manipulation, and the frequently used keyword is a keyword that is frequently used by a user in the vehicle; and
a vehicle-side control portion that executes a retrieval process based on a vehicle-side keyword that corresponds to one of the intended keyword inputted via the vehicle-side manipulation portion or the frequently used keyword inputted via the vehicle-side manipulation portion,
wherein the vehicle-side control portion transmits the vehicle-side keyword to the mobile communication terminal during the retrieval process, controls the mobile communication terminal to retrieve information related to the vehicle-side keyword by performing the retrieval service, acquires a retrieval result from the server via the mobile communication terminal, and controls the vehicle-side display portion to display the retrieval result as the information related to the retrieval service, and
wherein, when the vehicle-side keyword is equal to the terminal-side keyword, a quantity of the user manipulation required for inputting the vehicle-side keyword via the second vehicle-side input section of the vehicle device is less than a quantity of the user manipulation required for inputting the terminal-side keyword via the mobile communication terminal.

13. A mobile communication terminal applied in the information retrieval system according to claim 1, the mobile communication terminal independently performing a retrieval service, the mobile communication terminal comprising:
a terminal-side display portion that displays information related to the retrieval service;

a terminal-side manipulation portion that has a first terminal-side input section and a second terminal-side input section, wherein the first terminal-side input section enables an input of the intended keyword to be searched by multiple times of user manipulation, the second terminal-side input section enables an input of a predetermined keyword by at least two times of user manipulation; and a terminal-side control portion that transmits, to the server, a terminal-side keyword corresponding to one of the intended keyword inputted via the terminal-side manipulation portion or the predetermined keyword inputted via the terminal-side manipulation portion, acquires a retrieval result transmitted from the server, and controls the terminal-side display portion to display the retrieval result as the information related to the retrieval service, wherein, when the intended keyword is equal to the predetermined keyword, a quantity of the user manipulation required for inputting the predetermined keyword via the second terminal-side input section is less than a quantity of the user manipulation required for inputting the intended keyword via the first terminal-side input section.

14. An information retrieval program product stored in a non-transitory tangible computer-readable storage medium included in a vehicle device and comprising instructions to be executed by a computer, the vehicle device being connected to a mobile communication terminal that independently performs a retrieval service provided by a server placed outside a vehicle, the vehicle device performing the retrieval service via the mobile communication terminal, the instructions for implementing:

displaying information related to the retrieval service on a vehicle-side display portion of the vehicle device;

specifying a vehicle-side keyword that corresponds to one of an intended keyword or a frequently used keyword when a manipulation is made by a user on one of a first vehicle-side input section of the vehicle device or a second vehicle-side input section of the vehicle device, wherein the first vehicle-side input section enables an input of the intended keyword according to an intention of the user and the second vehicle-side input section is preliminarily assigned with the frequently used keyword and enables an input of the frequently used keyword directly by single time of the manipulation, and the frequently used keyword is a keyword that is frequently used by the user in the vehicle;

transmitting the vehicle-side keyword to the mobile communication terminal;

controlling the mobile communication terminal to retrieve information related to the vehicle-side keyword by performing the retrieval service;

controlling the mobile communication terminal to acquire a retrieval result from the server; and controlling the vehicle-side display portion to display the retrieval result as the information related to the retrieval service;

wherein, when a case in which the vehicle device performs the retrieval service by executing the retrieval process based on the vehicle-side keyword inputted to the second vehicle-side input section is compared with a case in which the mobile communication terminal independently performs the retrieval service based on the terminal-side keyword inputted to the terminal-side manipulation portion, a quantity of the user manipulation performed on the second vehicle-side input section of the vehicle device is less than a quantity of the user manipulation performed on the terminal-side manipulation portion of the mobile communication terminal.

* * * * *